US012597074B1

(12) United States Patent
Gangopadhyay et al.

(10) Patent No.: US 12,597,074 B1
(45) Date of Patent: Apr. 7, 2026

(54) METHOD AND SYSTEM FOR IDENTIFYING OVERPAYMENT OF CLAIMS

(71) Applicant: Espereo Inc., Skillman, NJ (US)

(72) Inventors: Sandipan Gangopadhyay, Skillman, NJ (US); Vijayaraj Chakravarthy, Hillsborough, NJ (US); Manoj Prasad, Redmond, WA (US); Timothy Kearney, Yaphank, NY (US); Priyanka Moorthy, San Jose, CA (US); Dheeraj Jeevagasami, Pittsburgh, PA (US); Ryan Britt, Kill Devil Hills, NC (US); Suchisrit Gangopadhyay, Skillman, NJ (US); Shushanth Masilamani, Houston, TX (US); Vallabh Vijayaraj, Hillsborough, NJ (US); Parag Karnik, River Vale, NJ (US); Suchisman Gangopadhyay, Skillman, NJ (US); Rachael Patel, Windham, NH (US)

(73) Assignee: ESPEREO INC., Skillman, NJ (US)

( * ) Notice: Subject to any disclaimer, the term of this patent is extended or adjusted under 35 U.S.C. 154(b) by 0 days.

(21) Appl. No.: 19/173,648

(22) Filed: Apr. 8, 2025

Related U.S. Application Data

(60) Provisional application No. 63/737,246, filed on Dec. 20, 2024.

(51) Int. Cl.
*G06Q 40/08* (2012.01)

(52) U.S. Cl.
CPC .................................... *G06Q 40/08* (2013.01)

(58) Field of Classification Search
CPC ...................................................... G06Q 40/08
See application file for complete search history.

(56) References Cited

U.S. PATENT DOCUMENTS

| | | | |
|---|---|---|---|
| 2021/0073915 A1* | 3/2021 | Crabtree | G06Q 30/0611 |
| 2023/0177613 A1* | 6/2023 | Crabtree | G06Q 10/0635 705/36 R |

* cited by examiner

*Primary Examiner* — Edward Chang
(74) *Attorney, Agent, or Firm* — Hamilton, Brook, Smith & Reynolds, P.C.

(57) ABSTRACT

A computer-based tool such as computer-implemented methods and systems identify and provide identification of anomalies in insurance claim payments. The computer-based tool receives in memory of a processor, raw claim data from a claim, and reconciles the received raw claim data with at least one entity of a knowledge graph to form reconciled claim data. The tool defines domain specific identities and relationships using the knowledge graph, applies a heuristic rule on the knowledge graph using the reconciled claim data, and creates a prediction of a presence of an anomaly in the reconciled claim data based on the heuristic rule applied to the knowledge graph. Responsive to the prediction of the presence of an anomaly resulting in no anomaly, the tool executes (closes) the claim, or, responsive to the prediction of an anomaly resulting in an anomaly, the tool flags the claim.

20 Claims, 14 Drawing Sheets

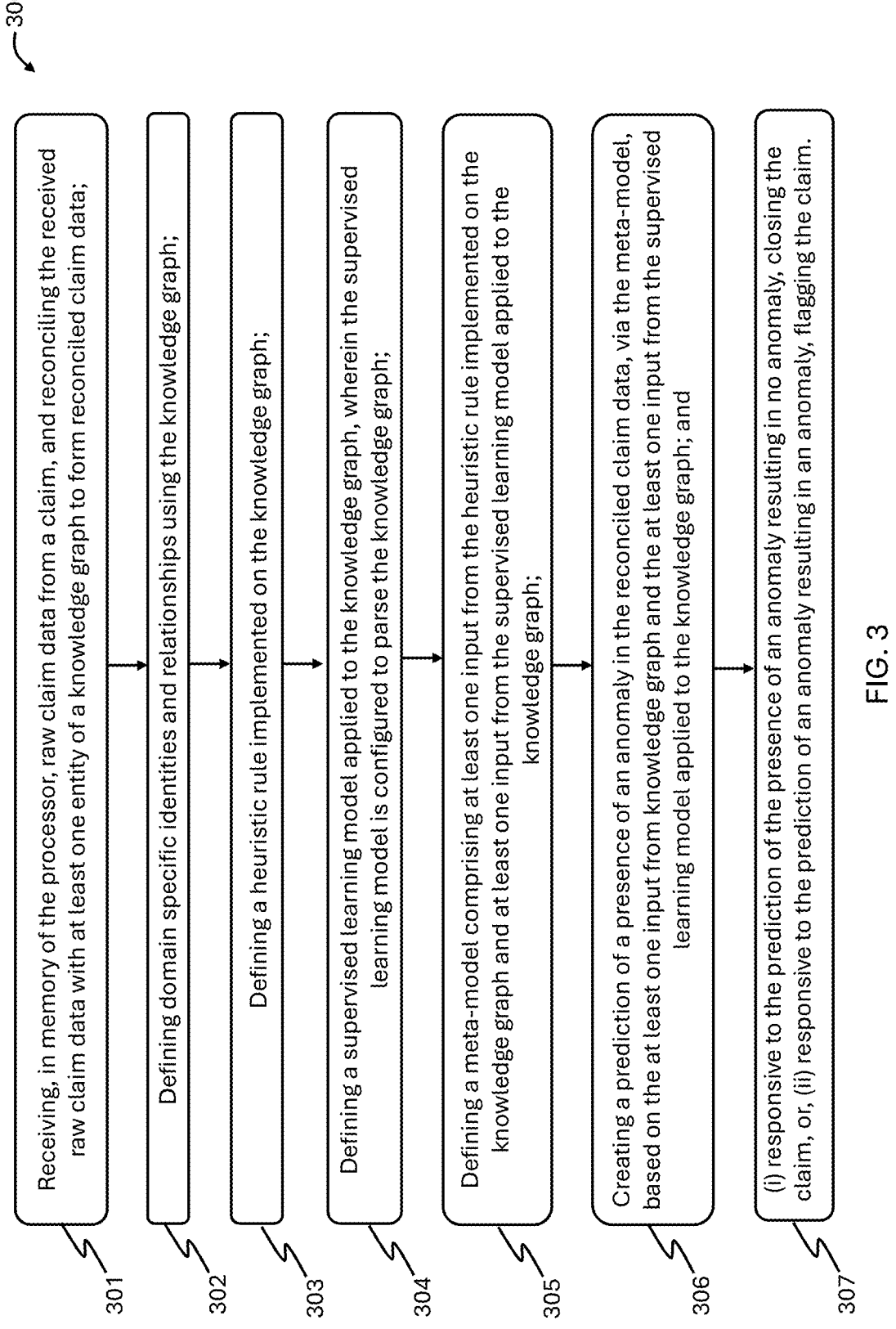

300

301 Receiving, in memory of the processor, raw claim data from a claim, and reconciling the received raw claim data with at least one entity of a knowledge graph to form reconciled claim data;

302 Defining domain specific identities and relationships using the knowledge graph;

303 Defining a heuristic rule implemented on the knowledge graph;

304 Defining a supervised learning model applied to the knowledge graph, wherein the supervised learning model is configured to parse the knowledge graph;

305 Defining a meta-model comprising at least one input from the heuristic rule implemented on the knowledge graph and at least one input from the supervised learning model applied to the knowledge graph;

306 Creating a prediction of a presence of an anomaly in the reconciled claim data, via the meta-model, based on the at least one input from knowledge graph and the at least one input from the supervised learning model applied to the knowledge graph; and 307 (i) responsive to the prediction of the presence of an anomaly resulting in no anomaly, closing the claim, or, (ii) responsive to the prediction of an anomaly resulting in an anomaly, flagging the claim.

FIG. 3

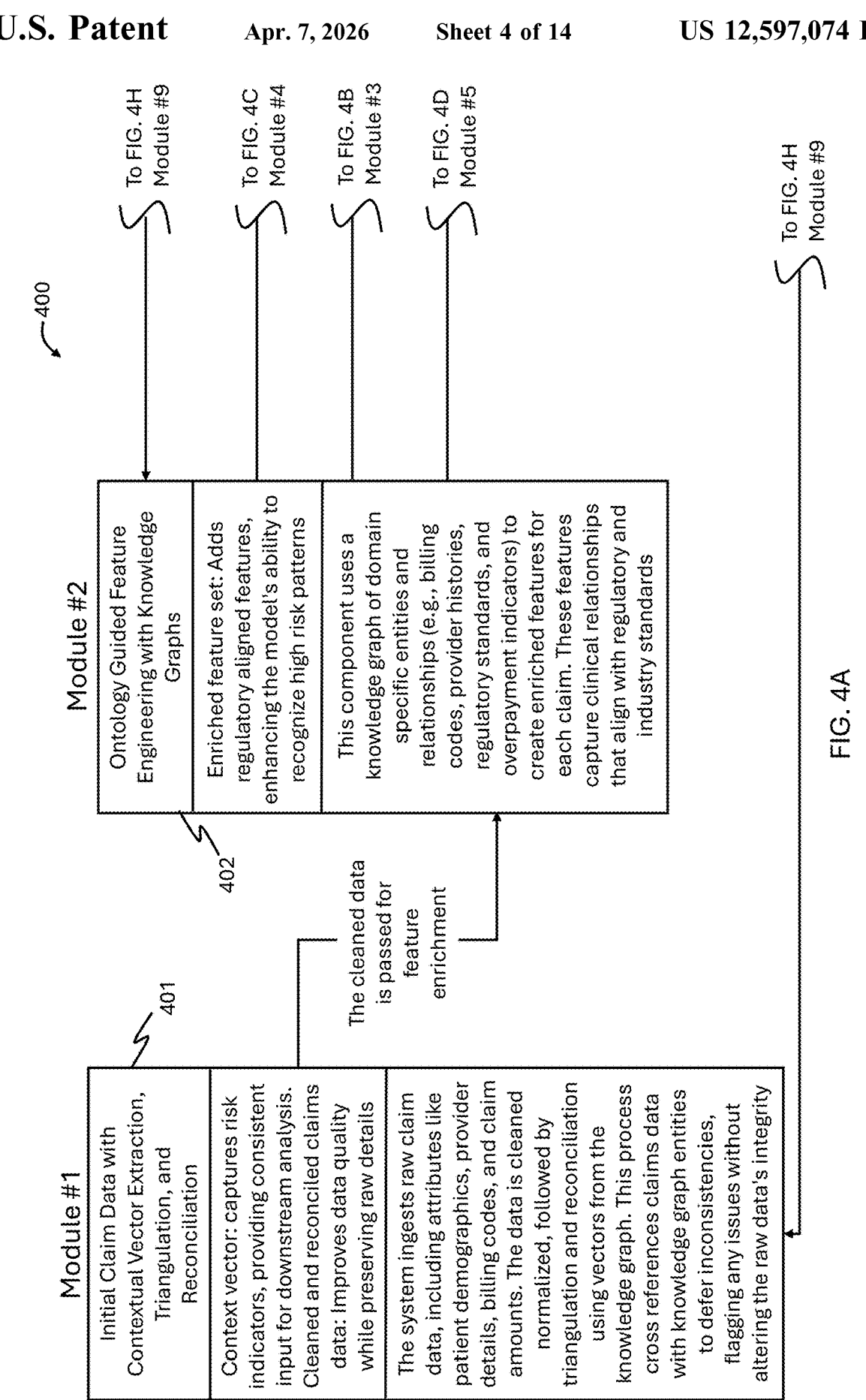

400

Module #2

Ontology Guided Feature Engineering with Knowledge Graphs

402

Enriched feature set: Adds regulatory aligned features, enhancing the model's ability to recognize high risk patterns This component uses a knowledge graph of domain specific entities and relationships (e.g., billing codes, provider histories, regulatory standards, and overpayment indicators) to create enriched features for each claim. These features capture clinical relationships that align with regulatory and industry standards To FIG. 4H
Module #9

To FIG. 4C
Module #4

To FIG. 4B
Module #3

To FIG. 4D
Module #5

Module #1

Initial Claim Data with Contextual Vector Extraction, Triangulation, and Reconciliation

401

Context vector: captures risk indicators, providing consistent input for downstream analysis. Cleaned and reconciled claims data: Improves data quality while preserving raw details The system ingests raw claim data, including attributes like patient demographics, provider details, billing codes, and claim amounts. The data is cleaned normalized, followed by triangulation and reconciliation using vectors from the knowledge graph. This process cross references claims data with knowledge graph entities to defer inconsistencies, flagging any issues without altering the raw data's integrity The cleaned data is passed for feature enrichment To FIG. 4H
Module #9

FIG. 4A

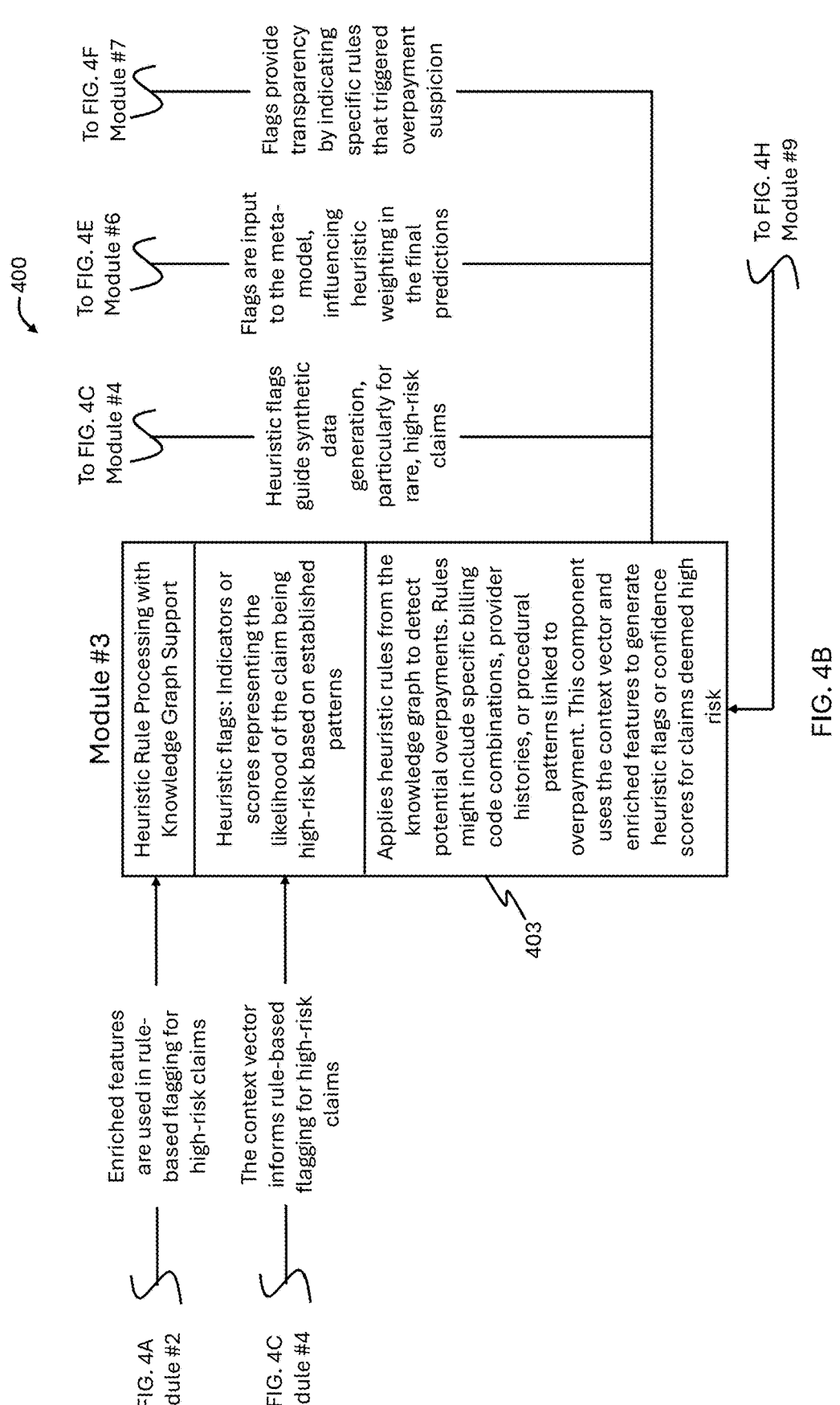

400

To FIG. 4A
Module #2

Enriched features are used in rule-based flagging for high-risk claims

To FIG. 4C
Module #4

The context vector informs rule-based flagging for high-risk claims

Module #3

Heuristic Rule Processing with Knowledge Graph Support

Heuristic flags: Indicators or scores representing the likelihood of the claim being high-risk based on established patterns Applies heuristic rules from the knowledge graph to detect potential overpayments. Rules might include specific billing code combinations, provider histories, or procedural patterns linked to overpayment. This component uses the context vector and enriched features to generate heuristic flags or confidence scores for claims deemed high risk

403

To FIG. 4C
Module #4

Heuristic flags guide synthetic data generation, particularly for rare, high-risk claims To FIG. 4E
Module #6

Flags are input to the meta-model, influencing heuristic weighting in the final predictions To FIG. 4F
Module #7

Flags provide transparency by indicating specific rules that triggered overpayment suspicion To FIG. 4H
Module #9

FIG. 4B

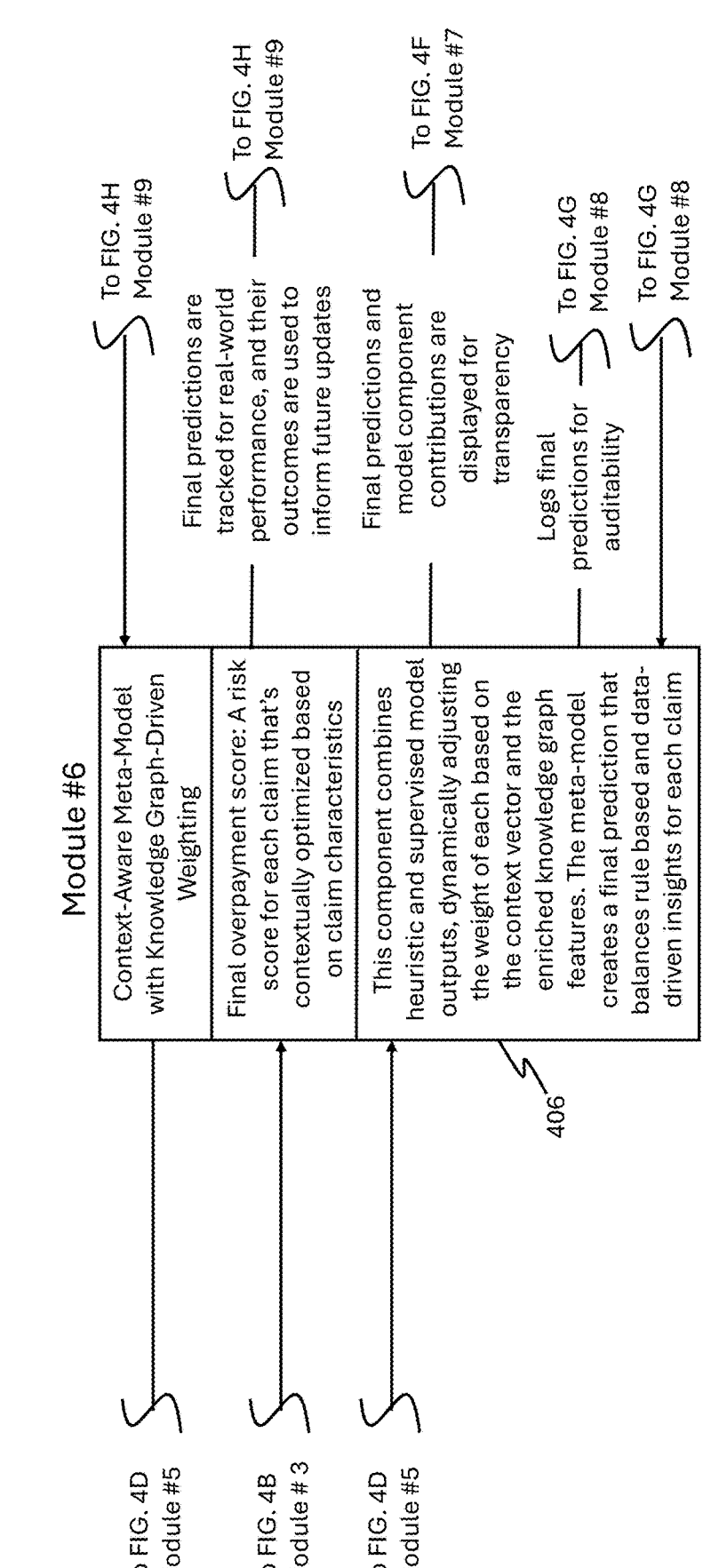

400

Module #6

Context-Aware Meta-Model with Knowledge Graph-Driven Weighting

Final overpayment score: A risk score for each claim that's contextually optimized based on claim characteristics This component combines heuristic and supervised model outputs, dynamically adjusting the weight of each based on the context vector and the enriched knowledge graph features. The meta-model creates a final prediction that balances rule based and data-driven insights for each claim

406

To FIG. 4D Module #5

To FIG. 4B Module # 3

To FIG. 4D Module #5

To FIG. 4H Module #9

Final predictions are tracked for real-world performance, and their outcomes are used to inform future updates To FIG. 4H Module #9

Final predictions and model component contributions are displayed for transparency To FIG. 4F Module #7

Logs final predictions for auditability

To FIG. 4G Module #8

To FIG. 4G Module #8

FIG. 4E

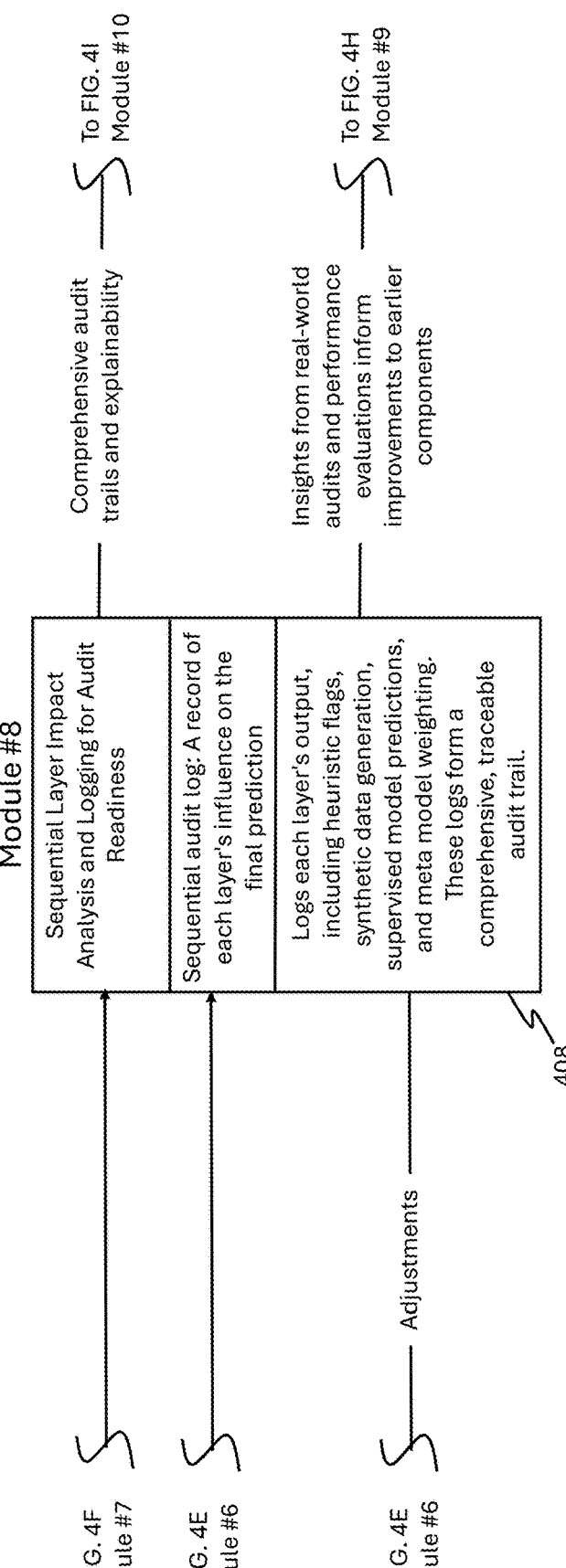

400

To FIG. 4I
Module #10

Comprehensive audit trails and explainability

To FIG. 4H
Module #9

Insights from real-world audits and performance evaluations inform improvements to earlier components

Module #8

Sequential Layer Impact Analysis and Logging for Audit Readiness

Sequential audit log: A record of each layer's influence on the final prediction Logs each layer's output, including heuristic flags, synthetic data generation, supervised model predictions, and meta model weighting. These logs form a comprehensive, traceable audit trail.

408

Adjustments

To FIG. 4F
Module #7

To FIG. 4E
Module #6

To FIG. 4E
Module #6

FIG. 4G

To FIG.4H
Module #9

400

Predictions
Anomalies
Recommendations

410

Module #10

Execution Output: Execution and Report

Execution

Decisioning engines take the outputs in recommendations, predicted values, classes identified, anomalies found and implement execution To FIG.4G
Module #8

METHOD AND SYSTEM FOR IDENTIFYING OVERPAYMENT OF CLAIMS

RELATED APPLICATION

This application claims the benefit of U.S. Provisional Application No. 63/737,246, filed on Dec. 20, 2024. The entire teachings of the above application is incorporated herein by reference.

BACKGROUND

After a healthcare provider provides goods or services to a patient, the healthcare provider submits an insurance claim to a healthcare insurer. Contents of the insurance claim include, among various data, for non-limiting example: (i) one or more standardized codes indicative of the goods or services rendered, (ii) patient identification and related information, (iii) healthcare provider identification, (iv) healthcare provider charges for the subject visit or exchange, and (v) healthcare provider description (dates, place, diagnosis, etc.) of the goods or services corresponding to the charges. The insurer in receipt of the claim assesses the claim data for proper codes, etc. and determines: (a) amounts to be paid to the healthcare provider, (b) amounts to be paid by the patient, and (c) amounts to be paid by health insurance(s).

A period of time after payment transactions have completed, there may be an audit process of insurance claims paid.

SUMMARY

Embodiments of the present invention provide methods and systems (i.e., a computer tool) that audit insurance claims, and in particular, that identify anomalies in paid insurance claims.

Identifying insurance claim overpayments, such as those paid out in fraudulent or duplicative insurance claims is a challenging process, in part due to the absence of standardized criteria for overpayment detection. Failure to identify these overpayments may lead to unnecessary and duplicative payments made from the insurance companies. In addition, the complicated network of relationships between billing codes, provider histories, overpayment indicators, etc., can make it challenging to analyze when a claim is likely to be fraudulent and require a further review. Further, because these overpayments are relatively infrequent when compared to claims that are not fraudulent or duplicative, it can be difficult to train a machine learning model to identify these overpayments. As such, there exists a need for a method of providing identification of anomalies (e.g., an overpayment, fraudulent transaction, etc.) in insurance claim payments. Embodiments provide for such improvements.

One such example embodiment is directed toward a computer-implemented method of providing identification of anomalies in insurance claim payments. The method includes, by a processor receiving, in memory of the processor, raw claim data from a claim, and reconciling the received raw claim data with at least one entity of a knowledge graph to form reconciled claim data. The method: (i) defines domain specific identities and relationships using the knowledge graph, (ii) defines a heuristic rule implemented on the knowledge graph, (iii) defines a supervised learning model applied to the knowledge graph, wherein the supervised learning model is configured to parse the knowledge graph, and (iv) defines a meta-model including at least one input from the heuristic rule implemented on the knowledge graph and at least one input from the supervised learning model applied to the knowledge graph. In turn, the method creates a prediction of a presence of an anomaly in the reconciled claim data, via the meta-model, based on the at least one input from the knowledge graph and the at least one input from the supervised learning model applied to the knowledge graph. The method (i) responsive to the prediction of the presence of an anomaly resulting in no anomaly, closes the claim, or (ii) responsive to the prediction of an anomaly resulting in an anomaly, flags the claim.

In an embodiment, the method includes training the supervised learning model to identify the presence of an anomaly in the knowledge graph. The embodiment includes the processor generating a set of previous claim data indicating the presence of an anomaly in the previous claim data, and generating a set of synthetic claim data indicating the presence of an anomaly in the synthetic claim data. The method then combines the generated previous claim data and the generated synthetic data, and trains the supervised learning model to identify anomalies by learning from the combined previous claim data and the synthetic claim data.

An embodiment includes updating the supervised learning model based on a history of previously identified anomalies in a previous claim data set.

Another embodiment includes adjusting a weight associated with each of the at least one entity within the knowledge graph based on a context vector associated with the at least one entity within the knowledge graph.

In an embodiment, the raw claim data includes at least one of: patient information, provider details, billing codes, and claim amounts.

In yet an embodiment, the meta-model is further configured to provide information as to which of the at least one entity contributed to the prediction of the presence of the anomaly, based on the at least one input from the knowledge graph and the at least one input from the supervised learning model.

In a further embodiment, the provided information includes an audit trail including a log of at least one of: an output of at least one layer making up the knowledge graph, an output of the supervised learning model, a heuristic flag within the heuristic rule wherein the heuristic flag indicates the possible presence of an anomaly, a synthetic data set, the created prediction of the presence of an anomaly, and a weighting applied to the knowledge graph.

Another embodiment includes providing feedback on identification of anomalies in insurance claim payments by collecting outcomes of the method including at least one of: an overpayment recovery, an overpayment audit, and a false positive.

In still another embodiment, the supervised learning model further includes a decision engine configured to create the prediction of the presence of an anomaly in the reconciled claim data.

In an embodiment, at least one autoencoder is configured to generate a synthetic data set.

Yet another embodiment is directed to a computer-based system identifies anomalies in insurance claim payments. The system includes a processor and a memory with computer code instructions stored thereon configured for generating or otherwise providing identification of anomalies in paid insurance claims. In particular, the processor and the memory, with the computer code instructions, are configured to cause the computer-based system to cause the system to implement any embodiments or combination of embodiments described herein.

It is noted that embodiments of the methods, systems, and computer program products may be configured to implement any embodiments, or combination of embodiments, described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 3 is a flow diagram illustrating a computer-implemented method of identifying and providing identification of anomalies in insurance claim payments, according to an embodiment.

FIGS. 4A-4I show a flow diagram of embodiments presented as an illustration of a functional foundation model, a system platform, or otherwise the set of operative components for implementing various embodiments.

DETAILED DESCRIPTION

Figure 1:
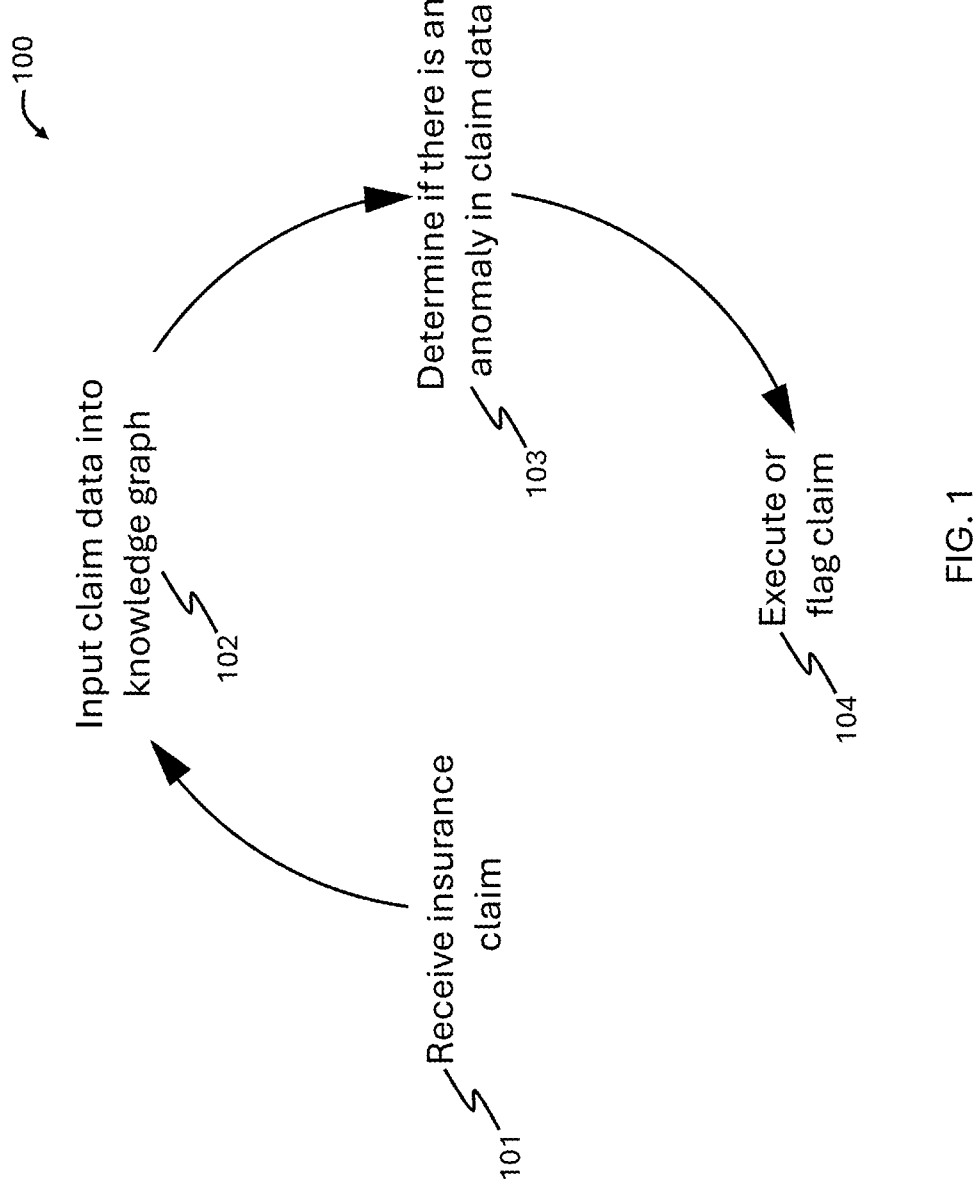
FIG. 1 is a flow diagram illustrating the lifecycle of an insurance claim in the context of embodiments disclosed herein.

A description of example embodiments follows.

The teachings of all patents, published applications and references cited herein are incorporated by reference in their entirety.

As used herein the term "healthcare provider" includes physicians, doctors, physician assistants, therapists, specialists, nurse practitioners, and the like. As used herein, the terms "risk of overpayment" of a claim, "overpayment risks," and "overpayment issue" with respect to a claim are used interchangeably and generally mean post-completion of payment transactions described above in the Background section.

The process of identifying claim overpayments presents significant computational and methodological challenges, primarily due to the absence of standardized, universally applicable criteria for overpayment detection. Lack of clarity introduces complexities in ensuring financial accuracy as well as regulatory compliance. Within the healthcare and insurance sectors, these challenges are further amplified by the intricate relationships among billing codes, provider histories, regulatory frameworks, and overpayment indicators, which must be accurately captured and analyzed. The infrequent occurrence of high-risk claims in real-world datasets exacerbates these difficulties, making it challenging to model their unique patterns against most regular claims. To address these issues, embodiments employ a hybrid approach that combines heuristic-based insights with knowledge graph-based representations to optimize machine learning models. This integration ensures that the model effectively generalizes while maintaining precision in identifying irregular high-risk claims. Claims flagged as high-risk by heuristic processors or models during inference are leveraged to generate synthetic data using knowledge graph relationships. This approach dynamically addresses data imbalance during training and incorporates new high-risk claim patterns as they emerge. By employing this adaptive pipeline, embodiments ensure a more effective and dynamic approach to claims processing and fraud detection.

Embodiments disclosed herein relate to a system and a method for identifying anomalies within insurance claims. For example, a medical professional such as a physician may see a patient for a particular ailment. The physician may perform a procedure and submit an insurance claim for the provided procedure to an insurance company in order to receive compensation for performing said procedure. These claims are reviewed by the insurance company, and the insurance company evaluates the submitted claim. For a non-limiting example, the insurance company may identify the particular claim code associated with the procedure, how much the physician is supposed to be compensated for performing said procedure, what the physician is asking to be compensated, how much is the patient supposed to pay, how much is the patient deductible for the procedure, the dollar amounts allotted to the patient for coverage after deductible, and how much the insurance company is supposed to pay.

Embodiments take insurance claim information and implement it within a knowledge graph. The intent of the knowledge graph is to identify anomalies within the audited claim, i.e., to ensure that the insurance company has not paid for unnecessary or fraudulent procedures or is not overpaying for standard procedures.

For a non-limiting example, say a patient goes to see a physician for a left knee injury, and the physician performs a surgery on the patient's left knee. The physician submits a first claim to the insurance company in order to receive compensation for the knee surgery. Then, a short while later, the same physician submits a second claim for left knee surgery for the same patient. This subsequent claim is likely to be fraudulent, as it is unlikely that the patient will need a subsequent knee surgery on the same knee so close in time to their previous knee surgery. During the claims auditing process, embodiments may flag to the insurance company that the subsequent claim possesses an anomaly, i.e., duplicative or close-in time claims, and bring this particular claim (the subsequent claim) to the attention of the insurance company's audit department for further investigation, follow-up, etc. Other embodiments may be utilized as a preventive measure before insurance company payment on claims instead of as an audit tool after claims payment transactions have occurred.

Embodiments provide for a knowledge graph configured with rules configured to identify various anomalies in claim submissions, paid claims, and the like. The knowledge graph may have a set of rules to identify anomalies, and a machine learning (ML) engine may help the knowledge graph to learn more nuanced rules during implementation.

FIG. 1 is a flow diagram 100 illustrating the lifecycle of an insurance claim in the context of embodiments disclosed herein. The insurance company may first receive 101 the submitted insurance claim. The insurance claim may contain, for a non-limiting example, a particular billing code, may identify the patient, the physician, the procedure performed, and so forth. This insurance claim information is received at the insurance company and is input 102 into the knowledge graph of embodiments disclosed herein. The knowledge graph responsively analyzes the insurance claim and implements heuristic rules with respect to the information provided in the insurance claim, determining 103 likelihood of the insurance claim being fraudulent. Based on the determination 103 of whether (likelihood) the insurance claim is fraudulent, embodiments flag the subject claim or execute (e.g., close the audit on, or otherwise transact, or the like) 104 the claim.

Figure 2:
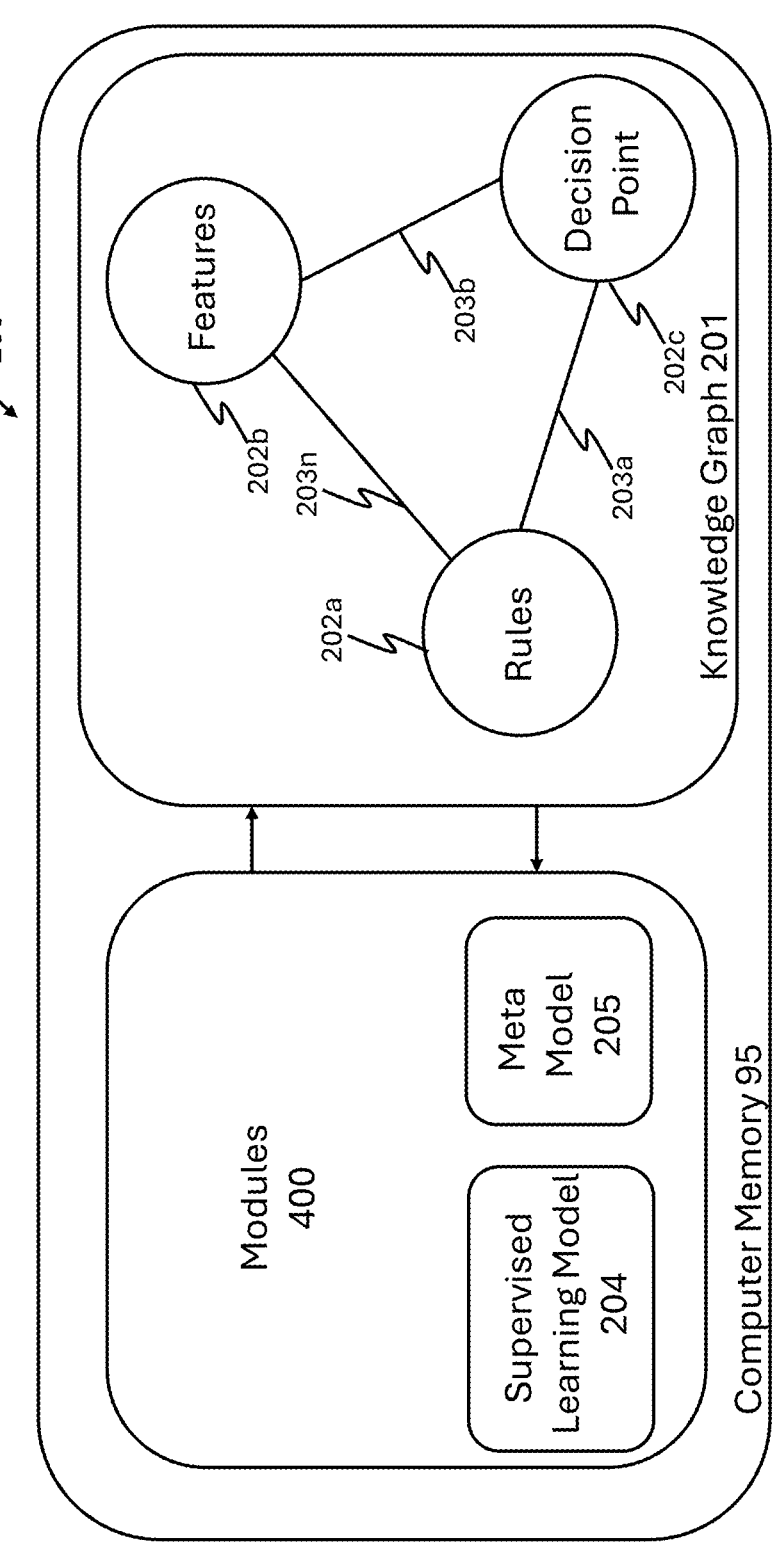
FIG. 2 is an illustration of a knowledge graph and associated computational environment employed by embodiments disclosed herein.

FIG. 2 is an illustration 200 of a knowledge graph and associated computational environment employed by embodiments disclosed herein. The knowledge graph 201 is stored on computer memory 95 (See FIG. 6). While this example knowledge graph 201 contains nodes 202a-c for heuristic rules 202a, features 202b, and decision points 202c, as well as edges 203a-n, a person of ordinary skill will understand that there may be a plurality of nodes 202a-c and edges 203a-n making up a larger knowledge graph that are not illustrated for brevity. Modules 400 (#1-#10 disclosed below) communicate with and operate on the knowledge graph 201 to implement embodiments disclosed herein. According to an embodiment, the supervised learning model 204 is configured to parse the knowledge graph in order to identify potential claims anomalies. According to another embodiment, the meta model 205 is configured to provide interpretability of the prediction of an anomaly in the claims data by identifying at least one output from the knowledge graph 201 and at least one output from the supervised learning model 204.

In an embodiment, the knowledge graph 201 is stored in at least one external database, or local memory, depending on the size of the knowledge graph. The disclosed modules implemented by embodiments are configured to communicate with the database system (externally or locally) storing the knowledge graph. According to an embodiment, the heuristic rules may also be stored in the same or a separate database, externally or locally, and are retrieved in the computation environment during execution. A person of ordinary skill will appreciate that embodiments disclosed herein will operate in the same manner irrespective of whether the knowledge graph is stored locally or externally.

According to an embodiment, the knowledge graphs may be updated based on the relationships found in the historical data. These relationships may be predetermined, e.g., stored as part of the historical data, they may be created by a user in the loop, or created by heuristics generated by the machine learning model (e.g., 204). The heuristic rules may be located in a database, and may be retrieved in the computation environment during execution.

In an embodiment, one master knowledge graph may be used to store relationships across audits and claims. This enables building of relationships while also providing interpretability for case specific relationships.

FIG. 3 is a flow diagram 300 illustrating a computer-implemented method of identifying or providing identification of anomalies in insurance claim payments, according to an embodiment. The method receives 301 in memory of a processor, raw claim data from, for example, an insurance claim. The raw claim data is reconciled with at least one entity of a knowledge graph to form reconciled claim data. Specifically, a parser (or preprocessor) cleans and normalizes the raw claim data contents, followed by triangulating and reconciling using vectors from the knowledge graph. For example, in one location the received raw claim data refers to a physician as "Dr. Robert" and in another location references the physician as "Doctor." Since these identifiers are different words (character strings), but refer to the same thing, they must be reconciled together within the knowledge graph. Some embodiments phrase the information within the knowledge graph in colloquial business terms. This process cross-references claims data with knowledge graph entities to check for inconsistencies.

Still referring to FIG. 3, the method defines 302 domain specific identities and relationships using the knowledge graph. For example, here, the knowledge graph may capture critical relationships among terms to align them with industry standards, e.g., that a 'physician' and a 'doctor' are the same entity for the purposes of this particular insurance claim. The method defines 303 a heuristic rule implemented on the knowledge graph. These rules might include, for a non-limiting example, specific billing code combinations, provider histories, or procedural patterns linked to overpayment. This component uses a context vector and enriched features to generate heuristic flags or confidence scores for claims deemed high-risk, the enriched features may be stored in a database for retrieval by the decision engine or the machine learning engine. For example, if patient Sally received a particular knee surgery last week, it is unlikely that Sally needs the same knee surgery (on the same or different leg) this week. A context vector is a concise representation of all the data in the knowledge graph that is relevant to the current claim decision making process. A context vector for a claim may include the provider, the patient details, the patient's claim history, the patient's insurance coverage, etc.

The method defines 304 a supervised learning model, that is applied to the knowledge graph. The supervised learning model 204 may be configured to parse the knowledge graph. The supervised learning model may be trained to identify the presence of an anomaly in the knowledge graph. Since an anomaly may only be present in a very small number of claims submitted for auditing, for example, one in one-hundred-thousand claims, a synthetic data set may need to be created in order to train the knowledge graph as to what constitutes an anomaly. The synthetic data set may be generated by a Heuristic-Augmented Sparse Data Enhancement (HASDE) module, coupled with autoencoders. According to an embodiment, the autoencoders may be configured to generate the synthetic data set. The HASDE module generates synthetic data, balancing the data set and focusing on high-risk cases. This module uses heuristic flags and knowledge graph relationships to guide synthetic data creation, while autoencoders learn the latent representations of high-risk claims. The autoencoders capture complex claim patterns, allowing HASDE to create realistic synthetic examples of claim anomalies. Embodiments may use both the synthetic data set and past real data sets to train the ML engine to identify anomalies in claims.

Embodiments may train the supervised learning model by the processor generating a set of previous claim data, generating a set of synthetic claim data indicating the presence of an anomaly in the synthetic claim data, combining the generated previous claim data and the generated synthetic claim data, and training the supervised learning model to identify anomalies by learning from the combined previous claim data and the synthetic claim data. Further, embodiments may update the supervised learning model based on a history of previously identified anomalies in the previous claim data set.

Still referring to FIG. 3, the method defines 305 a meta-model 205 comprising at least one input from the heuristic rule implemented on the knowledge graph and at least input from the supervised learning model applied to the knowledge graph.

The method creates 306 a prediction of a presence of an anomaly in the reconciled claim data, via the meta-model 205, based on the at least one input from the knowledge graph 201 and the at least one input from the supervised learning model 204 applied to the knowledge graph. Lastly, responsive 307 to the prediction of the presence of an anomaly resulting in no anomaly, the method outputs an allowance of the claim (indicates completion of the audit for closing the same, for non-limiting example). Alternatively, responsive 307 to the prediction of the presence of an anomaly resulting in an anomaly, the method flags the claim for further research and follow-up. According to an embodiment, the supervised learning model may further include a decision engine configured to create the prediction of a presence of an anomaly in the reconciled claim data.

Embodiments may combine heuristic and supervised model outputs, and dynamically adjust the weight of each based on a context vector, and the enriched knowledge graph features. The meta-model 205 creates a final prediction of a presence of an anomaly that balances rule based and data driven insights for each claim. For example, the model takes the applied heuristic rules, as well as both the real and synthetic data to create the rules-based learning model, i.e., the meta-model.

Embodiments provide for interpretability by mapping the model's predictions to entities within the knowledge graph. Embodiments may use techniques such as SHapley Additive exPlanations (SHAP) or Local Interpretable Model-Agnostic Explanations (LIME) in order to calculate feature contributions, which are contextualized using the knowledge graph to show how each feature connects to regulatory and domain specific knowledge. The interpretability allows for the insurance company to identify what rules contributed to the determination, or lack thereof, of an anomaly. By implementing this dual layer explanation, the rules-based layer (i.e., the knowledge graph 201 and the applied heuristic rules) and the supervised learning model 204 are both triggered.

According to an embodiment, the meta-model 205 may be configured to provide for the interpretability. The meta-model may be configured to provide information as to which of the at least one entity contributed to the prediction of the presence of the anomaly, based on the at least one input from the knowledge graph 201 and the at least one input from the supervised learning model 204. The interpretability, according to an embodiment, may effectively form an audit trail. The audit trail may include a log of at least one of: an output of at least one layer making up the knowledge graph, an output of the supervised learning model, a heuristic flag within the heuristic rule wherein the heuristic flag indicates the possible presence of an anomaly, a synthetic data set, the created prediction of the presence of an anomaly, and a weighting applied to the knowledge graph.

By using the audit trail, the user may gather insights from the system and auditors, particularly on the interpretability and prediction accuracy of the knowledge graph. This allows embodiments to collect real-world outcomes, such as overpayment recoveries, an overpayment audit, or false positives for feedback. Potential feedback sources may include market implementation results, i.e., tracking real world performance of the flagged claims and overpayment recoveries; and user and auditor feedback, i.e., gathering insights from system users and auditors, particularly on the interpretability and prediction accuracy. If the user is presented with the information on how the anomalies were found, the user can tell the system that a particular factor was not a good factor to consider in the determination; or, if it was a good factor to consider, the user could inform the system. For example, if a particular rule within the synthetic data set keeps causing the system to incorrectly flag a claim, the user can tell the system to disregard the synthetic data set and only focus on the approved heuristic rules.

According to an embodiment, a decisioning engine takes the outputs in recommendations, predicted values, classes identified, anomalies found, and implements execution of the claim, or flag it as fraudulent. The decisioning engine may be a module executed in the environment 400 discussed hereinbelow in relation to FIGS. 4A-4I.

FIGS. 4A-4I show a flow diagram of the modules environment 400 of embodiments presented as an illustration of a functional foundation model, a system platform, or otherwise the set of operative components for implementing various embodiments. The flow diagram illustrates modules 401-410 and stages for: (i) data ingestion and preparation (Module #1 401), (ii) processing and modelling layers (Modules #2 402, #3 403, #4, 404, #5 405, and #6 406), (iii) output and explainability layers (Modules #7 407, #8 408, and #10 410), and (iv) the feedback loop (Module #9 409).
Data Ingestion and Preparation Referring to FIG. 4A, Module #1 401 provides Initial Claim Data with Contextual Vector Extraction, Triangulation, and Reconciliation. This component is responsible for ingesting, cleaning, and structuring raw claim data, including patient information, claim amounts, provider details, billing codes, and service descriptions. The context vector and cleaned data are passed to the heuristic rule processing, supervised model, and meta-model, where they inform model predictions and adjust the weighting of risk sensitive claims. Module #1 401 stores in computer memory (see FIG. 6) context vectors and cleaned and reconciled claims data. The context vectors capture risk indicators, providing consistent input for downstream analysis. Cleaned and reconciled claims data improves data quality while preserving raw details.

The system ingests raw claims data, including attributes like patient demographics, provider details, billing codes, and claim amounts. The data is cleaned, (potentially de-identified) and normalized, followed by triangulation and reconciliation using the vectors from the knowledge graph 201. This process (by Module #1 401) cross-references claims data with knowledge graph entities to check for inconsistencies, finding any issues without altering the raw data is integrity and sets foundation for subsequent steps.

This process starts by retrieving and processing raw claim data. Techniques like handling missing values, normalization, and anonymization are applied. The context vector is created through feature extraction, consolidating fields relevant to overpayment prediction. For instance, high-risk billing codes and historical overpayments contribute to each claim's vector. The context vector is attached to the claim data, forming a standardized input for subsequent components. The context vector generation and feature engineering pipeline provide consistent, structured data ready for heuristic and machine learning analysis.

In overpayment contexts, the context vector captures regulatory compliant, high-risk indicators uniquely relevant to healthcare, providing a custom data structure that enhances accuracy and focus on high-stakes claims processing.

Module #1 401 may implement Algorithm 1 (ProcessClaimsData) to ingest and preprocess raw claims data, reconcile the data with the knowledge graph, and generate contextual vectors. An input to Algorithm 1 may be "raw_claims_data", "knowledge_graph", an output may be "cleaned_data", "context_vectors".

Algorithm 1:
  Begin
    Step 1: Load raw_claims_data into staging area
    Step 2: For each claim in raw_claims_data:
      Remove duplicates and handle missing values
      Standardize fields (e.g., dates, numerical formats)
      Reconcile data from different sources
    Step 3: For each claim in cleaned_data:
      Extract entities (e.g., provider, billing code, patient)
      Query knowledge-graph for relationships and anomalies
      If anomalies in claims data found:
        Flag claim with inconsistency type
    Step 4: Generate context_vectors by summarizing:
      Risk scores from knowledge_graph
      Frequency patterns (e.g., repeated claims)
    Return cleaned_data, context_vectors
  End Processing And Modeling Layers Still referring to FIG. 4A, Module #2 402 provides Ontology-Guided Feature Engineering with Knowledge Graphs. Responsive to the cleaned data from Module #1 401, Module #2 402 generates and maintains in computer memory (See FIG. 6) an enriched feature set. The enriched feature set adds regulatory-aligned features, enhancing the system's ability to recognize high-risk patterns.

This component (Module #2 402) uses a knowledge graph to map claims data to structured, domain specific relationships and augments raw data with features that reflect healthcare regulations and overpayment risks. Enriched features pass to the heuristic and supervised models, where they enhance model predictions and support graph-driven analysis in the dual layer explainability component.

By applying the knowledge graph, this component (Module #2) enriches claims data with new features representing known risk factors, such as frequent billing irregularities or high-risk provider types. These graphs enhanced features allow models to recognize patterns aligned with regulatory standards, boosting accuracy and overpayment detection. For instance, a feature may be added based on how often certain billing codes or providers are associated with overpayment flags, embedding domain knowledge into the dataset.

The knowledge graph stores relationships among entities (e.g., building codes, providers, and regulations). During processing, Module #2 maps claims data to this graph, identifying entities with established overpayment risk associations. Features are created based on these connections and added to the claims data, reflecting high-risk relationships. Module #2 supports the model's interpretability and robustness by ensuring features are rooted in relevant regulatory standards.

Using the knowledge graph to create regulatory aligned features ensures claims are evaluated within a real-world compliance framework, enhancing model interpretability and relevance.

Traditional feature extraction methods often fail to capture the rich relational and contextual knowledge embedded in these domains. To address this gap, embodiments leverage knowledge graphs to derive and enrich features for each claim. This process utilizes the knowledge graph's structure, relationships, and attributes to generate numerical or categorical representations that reflect the inherent domain specific knowledge. These features align with regulatory and industry standards, ensuring they are meaningful and interpretable to their downstream machine learning models. Embodiments efficiently transform the knowledge graph into a set of features that are both computationally feasible and predictive of key outcomes, such as claim validity or overpayment risk.

Domain specific features may include centrality measures. Centrality measures quantify a node's importance in the graph by degree centrality, betweenness centrally, and PageRank. With respect to degree centrality, a number of direct connections (e.g., number of claims filed by a provider) may be implemented. A high degree of centrality for a provider could indicate that they file a disproportionate number of claims. Such providers might be worth closer scrutiny for overpayment risks. Betweenness centrality indicates the frequency of a node appearing on shortest paths (e.g., a provider acting as a bridge in a fraudulent network). A provider with high betweenness centrality might act as an "bridge" in fraudulent networks, connecting otherwise unconnected claims or patients. This could indicate a role in systematic overpayments. PageRank indicates importance of a node based on its connections. A claim with high PageRank could be connected to several influential nodes, such as frequently flagged providers or high-risk diagnosis.

Domain specific features may also include proximity metrics. Proximity metrics measure the closeness of nodes within the graph. Proximity metrics may include the shortest path length, and neighborhood overlap. Shortest path length indicates a distance between two entities (e.g., claim and flagged over payment cases). Neighborhood overlap may indicate similarity of neighbors between nodes (e.g., shared diagnosis between patients).

Community features may include grouping nodes into clusters to capture shared patterns. Embodiments may use clustering algorithms such as, for example, Louvain or spectral clustering, to identify communities and encoding cluster memberships as categorical features.

Temporal and sequential features may include temporal centrality and interaction trends. Temporal centrality tracks how a nodes performance changes over time, while interaction trends identify spikes or anomalies in interactions. For example, a spike in a claim submission may be that a provider consistently files 30 claims per week but submits 100 claims in one week. If these claims are tied to procedures with historically high overpayment risks, the spike warrants investigation.

Feature extraction tools may include, for example, Neo4j for querying and extracting features using, for example, Cypher; NetworkX for graph metrics and subgraph analysis; and, PyTorch Geometric for node embeddings and Graph Neural Networks (GNN).

For real data, knowledge graphs help uncover hidden relationships between entities (e.g., patients, claims, providers) that are not apparent in tabular data sets. Frequency of provider interactions with flagged entities and connections between diagnosis and overpayment patterns are a few examples. For synthetic data, knowledge graphs validate that the relationships generated in these datasets mimic those in real world data to ensure realism and quality.

Feature enrichment may include real data and synthetic data. For real data, derived features like centrality, community memberships, or edge weights may be used to augment machine learning models. Real data generates insights into which relationships or attributes contribute to overpayment or risk scores. For synthetic data, feature engineering is experimented by creating synthetic relationships or altering graph structures. Synthetic data tests how changes in features affect predictive and model performance.

The enriched data from Module #2 402 is accessible to Module #3 403 (FIG. 4B) where enriched features are used in rule-based flagging for high-risk claims.

Module #2 402 provides to Module #5 405 (FIG. 4D) the enriched data that strengthens the system's ability to detect nuanced overpayment risks (overpayment issues).

Module #2 402 also provides enriched data to Module #4 404 where the enriched data informs synthetic data generation with domain-specific characteristics for high-risk scenarios.

Module #2 402 may implement Algorithm 2 (EnrichFeaturesWithKnowledgeGraph) enrich each claim data with domain-specific insights using the knowledge graph. An input to Algorithm 2 may include "cleaned_data", "knowledge_graph", "context_vectors", and an output may be "enriched_features".

Algorithm 2
  Begin
    Step 1: For each claim in cleaned_data:
      Extract claim attributes (e.g., billing code, provider)
      Query knowledge_graph for enriched relationships
    Step 2: For each attribute:
      Retrieve additional properties (e.g., code hierarchy, provider history)
      Compute derived features (e.g., duration of service, overpayment likelihood scores)
    Step 3: Aggregate enriched attributes into enriched_features vector
    Return enriched_features
  End Referring to FIG. 4B, Module #3 403 provides Heuristic Rule Processing with Knowledge Graph Support. Module #3 403 generates heuristic flags. The heuristic flags are indicators or scores representing the likelihood of a claim being high-risk based on system established patterns.

Module #3 applies domain specific rules to claims using the knowledge graph 201 to identify relationships and overpayment risk factors, generating flags for high-risk claims. Flags are passed to HASDE (Heuristic Augmented Sparse Data Enhancement), supervised learning model 204, and the meta-model 205, impacting synthetic data creation and weighting and predictions.

Heuristic processing involves querying the knowledge graph 201 for rules and applying them to claims data. For example, a claim with flagged billing codes and a high-risk provider might be assigned a confidence score or a binary flag for potential overpayment. This rule engine provides baseline risk indicators that integrate with data-driven models to improve accuracy and interpretability.

The knowledge graph 201 stores relationships and regulatory rules, which are checked against each claim. Rules operate on relationships within the graph, identifying claim elements that align with known overpayment risks. The engine is flexible, allowing updates based on new regulations, and during up-to-date compliance. The graph-enabled rules can be dynamically adjusted as regulations change, allowing for continuous alignment with compliance standards.

The use of deterministic rules at the claim level, guided by Recovery Audit Contractor (CMS RAC) and procedure-to-procedure (PTP) edits, provides a foundation for a more precise and systematic approach to identifying overpayments, replacing subject assessments with data-driven processes. This optimizes resource allocation by redirecting human effort toward higher value tasks while significantly lowering operational costs associated with overpayment analysis. Embodiments leverage structured heuristic rules to automate the filtering analysis of claims, thereby enhancing accuracy an efficiency and overpayment detection. To achieve this, embodiments implement a multi-layered, deterministic rule engine to systematically isolate claims that fail specific edit checks.

The deterministic rule engine may include data sources, define rules for filtering, and implementation. According to an embodiment, the deterministic rule engine may be a module executed in the environment 400 discussed herein in relation to FIGS. 4A-4I. For data sources, embodiments ingest electronic data interchange (EDI) data from various healthcare providers. Embodiments identify critical attributes required for overpayment analysis and perform data preprocessing to handle missing values and create a structured, analyzable data set. For defining rules for filtering, embodiments focus on implementing automated RAC edits using a deterministic programming approach and develop and deploy a rules engine where each rule is layered sequentially, processing each claim independently to ensure comprehensive validation. Embodiments implement claim level joins to analyze line-item attributes such as procedure codes, service dates, and claim identifiers. Embodiments also integrate rule logic into a modular platform, enabling dynamic code execution for rule application and facilitating real time updates to rule definitions. Further, embodiments deploy a listener mechanism that monitors incoming raw data streams, triggering the rule engine to process and evaluate new claims continuously.

Module #3 403 applies heuristic rules from the knowledge graph 201 to detect potential overpayments. Rules might include specific billing code combinations, provider histories, or procedural patterns linked to overpayment. This component (Module #3 403) uses the context vectors from Module #1 401 and the enriched features from Module #2 402 to generate heuristic flags or confidence scores for claims deemed high-risk.

Module #3 403 also provides resulting heuristic flags or scores to Module #4 404 (FIG. 4C) where the heuristic flags guide synthetic data generation, particularly for rare, high-risk cases.

Module #3 403 provides resulting heuristic flags or scores to Module #6 406 (FIG. 4E). At Module #6 406, the heuristic flags are input to a meta-model, influencing heuristic weighting in final predictions.

Figure 4C:
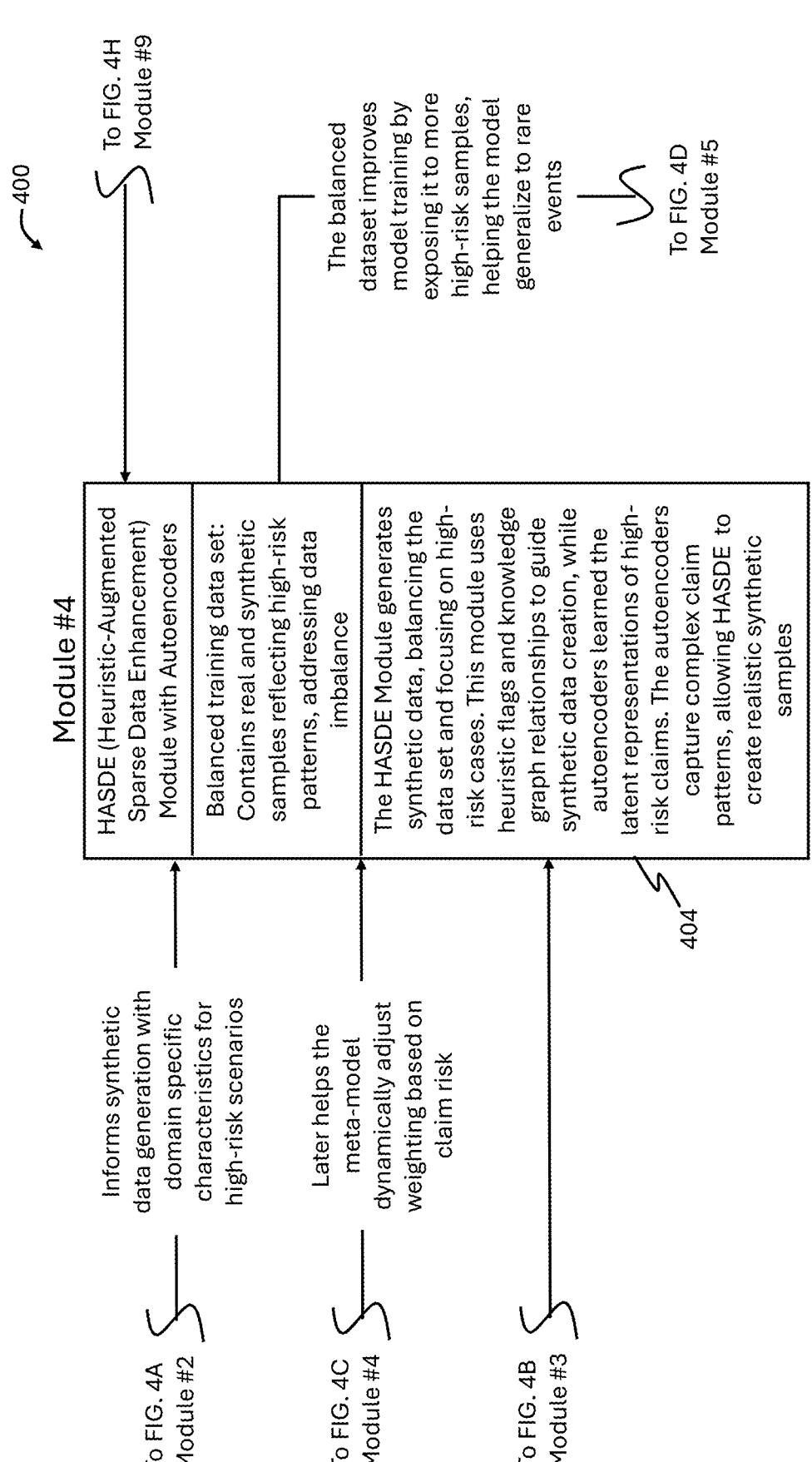
Figure 4D:
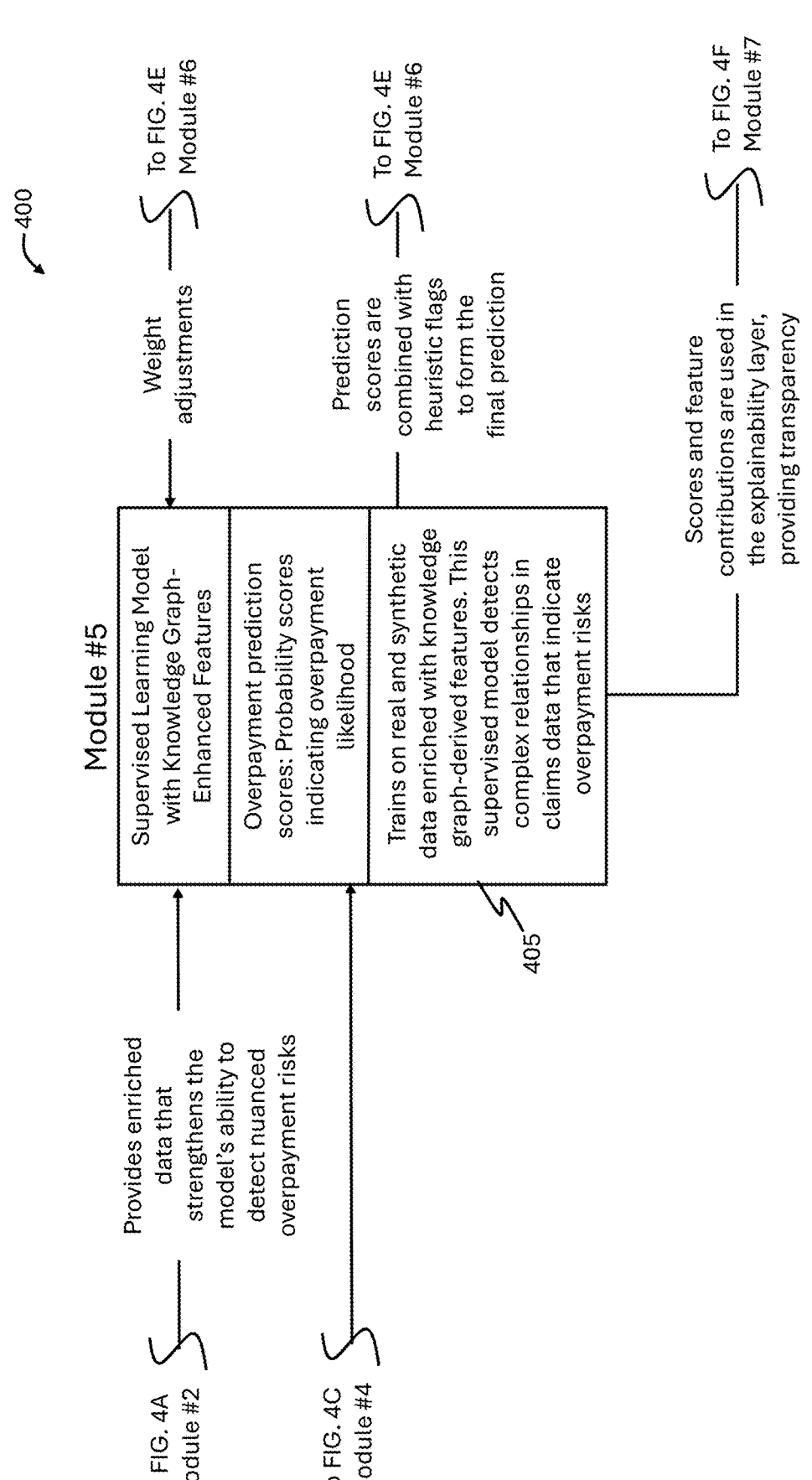
Figure 4F:
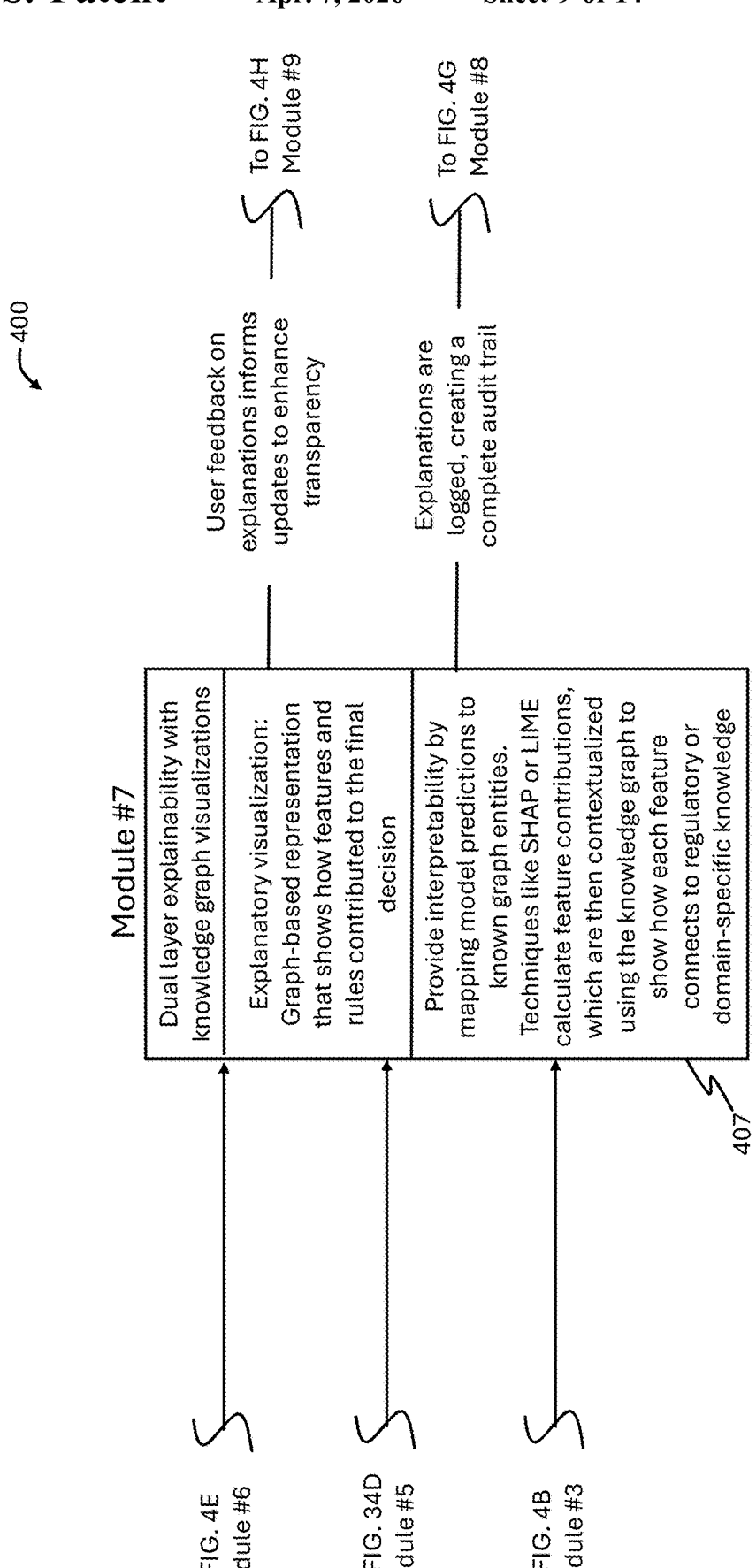

Module #3 403 also provides resulting heuristic flags or scores to Module #7 407 (FIG. 4F). At Module #7 407, the heuristic flags provide transparency by indicating specific rules that triggered overpayment suspicion.

Implementing this heuristic based approach allows for efficient overpayment identification, benefiting both auditors and machine learning models used for predictive analysis. The flexible architecture of the rule engine allows for seamless rule updates, ensuring adaptability to changing regulations and a new audit criterion.

Module #3 403 may implement Algorithm 3 (ApplyHeuristicRules) to apply heuristic rules and generate risk flags. An input to Algorithm 3 may include "enriched_features", "heuristic_rules", "knowledge_graph", and an output may be "heuristic flags".

Algorithm 3
  Begin
    Step 1: For each claim in enriched_features:
      Initialize flag=0
      For each rule in heuristic_rules"
        Evaluate rule conditions on claim attributes If rule conditions are met:
    Set flag=1
    Record rule_id triggering flag
  Step 2: Validate heuristic_flags with knowledge_graph:
    If flag conflicts with known relationships:
      Adjust flag or request manual review
    Return heuristic_flags
  End Referring to FIG. 4C, Module #4 404 is a HASDE module. Module #4 404 stores in memory (See FIG. 6) a balanced training dataset. The training dataset contains real and synthetic samples reflecting high-risk patterns, addressing data imbalance.

The HASDE module (Module #4 404) generates synthetic data, balancing the dataset and focusing on high-risk patterns from the heuristic layer, guided by the knowledge graph. This module uses heuristic flags (from Module #3 403, FIG. 4B) and knowledge graph relationships to guide synthetic data creation, while autoencoders learn the latent representations of high-risk claims. The autoencoders capture complex claim patterns, allowing the HASDE module to create realistic synthetic samples.

Module #4 404 shares the balanced training dataset to Module #5 405 (FIG. 4D). In Module #5 405, the balanced dataset improves model training by exposing the model to more high-risk samples, helping the model generalize to rare events.

Using Synthetic Minority Over-sampling Technique (SMOTE) adapted to heuristic patterns, HASDE creates synthetic samples by adapting SMOTE with heuristic patterns, thereby balancing the data set for the supervised learning model 204. The knowledge graph 201 provides historical claim data, allowing synthetic samples to realistically represent over payment scenarios. Outputs from this layer 404 feed into the supervised model 204, enriching its training data set for more accurate payment predictions.

Heuristic flags guide SMOTE, generating synthetic samples that mirrors patterns found in the knowledge graph 201. This targeted sampling procedures a training set representative of overpayment cases, improving model sensitivity to sparse events. Knowledge graph informed SMOTE ensures synthetic data aligns with domain standards, avoiding bias or overfitting on rare patterns.

This is implied to embodiments through the use of a Variational Autoencoder (VAE) optimized with Binary Cross-Entropy (BCE) loss. BCE ensures that the synthetic data aligns closely with the distribution of real high-risk claims while capturing the essential nuances of such events. Auto encoders are neural networks designed to learn efficient data representations by reconstructing input data. They consist of two parts, the Autoencoder and BatchNormalization layers. The synthetic data is generated at a claim line level for each of the claims identified as high-risk by the heuristic module. The encoder maps the input data to a compressed latent space, and the decoder reconstructs the input from the latent representation.

Generating synthetic data for overpayment identification involves training the auto encoder on minority class, sampling latent space, and reconstructing synthetic data. The autoencoder trains exclusively on the overpayments data. This ensures the model learns the unique patterns of this class. Sampling latent space involves generating new latent vectors by sampling from the learned latent spaced distribution of the overpayments. Reconstructing the synthetic data involves passing the sampled latent vectors through the decoder to produce synthetic samples that resemble overpayments. To introduce variability and avoid overfitting to the existing data, a minor noise is introduced to the latent representation. This ensures the synthetic claims data differs slightly from the original data while still reflecting the overall patterns and characteristics of high-risk claims. The decoder processes this modified latent representation and reconstructs in back to high dimensional space. This approach allows for the generation of realistic synthetic data that captures the variability of the minority class.

Embodiments may analyze the performance of the autoencoders by reconstructing error trends, i.e., comparing errors for original and synthetic data to validate synthetic data quality.

Module #4 404 may implement Algorithm 4 (GenerateSyntheticData) to generate synthetic data using heuristic guidance and autoencoders. An input to Algorithm 4 may be "high_risk_claims", "heuristic flags", "heuristic_rules", an output may be "synthetic_claims".

Algorithm 4
  Begin
    Step 1: Train autoencoder on high_risk_claims:
      Input: high_risk_claims
      Output: Encoded latent representations
    Step 2: Generate synthetic_claims:
      For each latent_representation:
        Introduce minor random variations
        Decode using trained autoencoder
    Step 3: Validate synthetic_claims with heuristic_rules, heuristic_flags:
      Ensure synthetic_claims align with heuristic rules and heuristic_flags
    Return synthetic_claims
  End Referring to FIG. 4D, Module #5 405 provides a Supervised Learning Model with Knowledge Graph-Enhanced (i.e., expert knowledge from practitioners) features. The enhanced features allow the model to detect subtleties specific to overpayment patterns. Module #5 405 generates and stores in computer memory (See FIG. 6) overpayment prediction scores. In embodiments, the overpayment prediction score is a probability score that indicates overpayment likelihood. To accomplish such, Module #5 405 trains on real and synthetic data enriched with knowledge graph-derived features (i.e., training data received from Module #4 404). This supervised machine learning model of Module #5 405 detects complex relationships in claims data that indicate overpayment risks (overpayment issues).

Module #5 trains on enriched claim data, identifying patterns that suggest over payment likelihood, leveraging both synthetic samples and graph-based features. This module outputs predictions to the meta-model, informing final risk scoring alongside heuristic insights.

By training on augmented data, the supervised model accurately detects both routine and complex overpayment indicators. The knowledge graphs regulatory informed features enabled the model to pick up on domain specific relationships.

Module #5 uses gradient boosting or neural networks, allowing the model to learn from a feature-rich dataset that includes both real and synthetic samples. This enables the model to generalize effectively to new claims, producing probability scores that indicate overpayment risk.

Module #5 405 provides resulting data (generated overpayment prediction scores) to Module #6 406 (FIG. 4E). Responsively, Module #6 406 combines prediction scores (of Module #5 405) with heuristic flags (from Module #3 403) to form the final prediction.

Module #5 405 also provides said resulting data to Module #7 407 (FIG. 4F) where the scores and feature contributions are used in the explainability layer, providing transparency.

The preprocessed data post feature engineering with knowledge graphs and the HASDE synthetic data is used to train supervised models. The primary goal is to predict whether a claim is high-risk, leveraging preprocessed and engineered features. Different subsets of features are used to identify specific types of high-risk claims.

Module #5 405 utilizes feature aggregation levels. Each specialized to solve for a particular high-risk claim type by training with different subsets of these features, for example claim line and patient provider contributions. With respect to claim line, features are extracted from individual claim lines, such as surface codes, costs, and quantities. With respect to patient provider combinations, embodiments aggregate features that consider the history and interactions between specific patients and providers.

Module #5 405 also utilizes autoencoder-decoders. For the claim level features, embodiments train and autoencoder-decoder model on the overpayment high-risk claim knowledge graph, which represents a small yet crucial subset of the claims. This approach allows the auto encoder to focus on capturing the unique patterns and features that distinguish high-risk claims from others. By training exclusively on high-risk claims, the encoder learns a compact, informative, latent representation that highlights the most relevant features for identifying these claims. The lower dimensional latent space captures the distribution of high-risk claims, adding in the differentiation of the minority class from others. This reduced representation is beneficial for both interpretability and further analysis. The model is optimized using BCE loss, a standard function for binary classification tasks. BCE loss minimizes the reconstruction error while also ensuring the model learns the essential features of high-risk claims.

Module #5 405 also utilizes evaluation metrics. To evaluate the performance of autoencoders, embodiments perform residual analysis and the reconstructed data. Error metrics like row-level mean-squared errors, row-level differences are calculated for each row between the reconstructed and the original data. An optimized threshold is identified to clearly separate the overpaid claims from the regular claims. This evaluation is based on the hypothesis that the residuals while reconstructing the overpaid claims are lesser as compared to the residuals while reconstructing the regular claims.

Module #5 405 may implement Algorithm 5 (TrainSupervisedModel) to train a supervised learning model using enriched features and synthetic data. An input to Algorithm 5 may be "cleaned_data", "enriched_features", "synthetic_claims", an output may be "trained_model".

Algorithm 5
 Begin
  Step 1: Combine cleaned_data with enriched_features and synthetic_claims into training_data
  Step 2: Split training_data into train and validation sets
  Step 3: Train supervised_model on train sets:
   Perform data transformations required for training (e.g., one-hot encoding)
    Use gradient boosting, random forest, or neural network
  Step 4: Evaluate model on validation set:
   Perform data transformations to pass validation data to the model
    Compute metrics (precision, recall, F1-score)

Step 5: Fine-tune hyperparameters to optimize performance
   Return trained_model
 End Referring to FIG. 4E, Module #6 406 provides a Context-Aware Meta-Model with Knowledge Graph-Driven Weighting.

Module #6 406 creates, via the context-aware meta-model, a final overpayment score and stores the same in computer memory. The final overpayment score serves as a risk score for the respective claim that is contextually optimized based on claim characteristics.

This component (Module #6 406) combines heuristic outputs (of Module #3 403) and supervised model outputs (of Module #5 405), dynamically adjusting the weight of each based on the context vector and enriched knowledge graph features. Module #6 406 draws inputs from heuristic and supervised models, adjusting weights based on contextual claims information from the graph. The meta-model creates a final prediction that balances rule-based and data-driven insights to each claim.

In Module #6 406, weights a (alpha) and p (beta) are adjusted based on contextual factors (e.g., claim amount, provider history) extracted from the graph. High-risk claims leverage more heuristic wage, while routine claims favor supervised predictions.

This methodology combines heuristic outputs and supervised model predictions, dynamically calibrating their weights using context vectors enriched with feature representations extracted from the knowledge graph. The meta-model creates a final prediction by balancing rule based and data-driven insights for each claim. For supervised models, these weights are determined by their performance metrics, reflecting their reliability. Heuristic rules act as guardrails, which is particularly valuable when supervised models deviate from performance and penalizes the deviations. As a result of the guardrails and deviation penalties, embodiments (i) reduce the influence of the supervised model when it conflicts with the heuristic rules, (ii) reduce the need for extensive pre-validation logic in earlier stages, and (iii) reduce hallucination that stray from the established patterns. By applying this mechanism at the meta-model level, the need for extensive pre-validation logic in earlier stages is significantly reduced. This also ensures that domain specific rules are seamlessly incorporated into the decision-making process, leading to a more interpretable and trustworthy model output.

For example, suppose a heuristic rule is that "Billing code X of diagnosis A (e.g., surgery code for a heart transplant) must not appear with Billing Code Y of diagnosis B (e.g., routine dental checkup)." This rule reflects a hard domain constraint. Any prediction or model output supporting this invalid combination should be penalized heavily to ensure the system respects critical domain knowledge. An output of the supervised model may be analyzing the behavior of each model when presented with the invalid combination of billing code X and Y.

A heuristic output may be flagging, i.e., marking the combination as invalid and providing a confidence score of "1" (indicating absolute certainty the combination is wrong). A hard constraint may override any prediction supporting this combination.

For the supervised models, an isolation forest may assign a high anomaly score (e.g., 0.95), indicating this combination is unusual. A random forest may predict a high validity probability (e.g., 76%). A one-class Support Vector Machine (SVM) may classify the combination as an outlier with a strong margin distance from valid data. The autoencoder-decoder may produce a high reconstruction error (e.g., 0.85), signaling misalignment with learned valid patterns.

The meta-model response may be that: (i) the heuristic's confidence score of 1 dominates, (ii) the random forest's weight is heavily penalized due to its conflict with the heuristic, (iii) the isolation forest, one-class SVM, and autoencoder outputs reinforce the heuristic decision, retaining or increasing their weights.

The final decision may be that the claim is marked invalid with an explanation citing the heuristic constraint as the primary reason.

Module #6 406 feeds back to Module #5 405 weight adjustments.

On output, Module #6 406 provides to Module #7 407 (FIG. 4F) the final predictions and displays model component contributions for transparency.

Module #6 406 further logs final predictions in Module #8 408 (FIG. 4G) for auditability. In turn, Module #8 408 feeds to Module #6 406 adjustments resulting from audits.

The final predictions from Module #6 406 are tracked by Module #9 409 (FIG. 4H) from real-world performance, and their outcomes are used to inform future system updates.

Module #6 406 may implement Algorithm 6 (MetaModelPrediction) to combine heuristic and supervised predictions using dynamic weighting. An input to Algorithm 6 may be "heuristic_flags", "supervised_predictions", "knowledge_graph_context", and an output may be "final_risk_scores".

Algorithm 6
  Begin
    Step 1: For each claim:
      Retrieve heuristic_flag and supervised_prediction
      Query knowledge_graph_context for risk factors
    Step 2: Calculate weights:
      heuristic_weight=f(knowledge_graph_context,
        claim_attributes)
      supervised_weight=1−heuristic_weight
    Step: 3 Compute final_risk_score:
      final_risk_score=(heuristic_weight*heuristic_flag)+
        (supervised_weight*supervised_prediction)
    Return final_risk_scores
  End Output And Explainability Layers Referring to FIG. 4F, Module #7 407 provides Dual-Layer Explainability with Knowledge Graph Visualizations.

Module #7 407 provides visual traceability, linking model predictions to maintain knowledge for transparency in decision making. These visualizations support compliance and auditability for heuristic, supervised, and meta-model decisions. This generates explainable output by mapping decisions to regulatory knowledge, allowing users to explore graph driven connections that informed predictions. This is done by feature attribution methods tracing heuristic and data-driven insights through the graph, connecting each factor to regulatory standards.

This method enhances interpretability in clinical research by offering dual layer explanations for model predictions. It provides interpretability by mapping model decisions to knowledge graph entities, leveraging techniques like SHAP or LIME to attribute feature importance. This contextualizes model decisions with domain knowledge, making it clear how each prediction aligns with regulatory and compliance standards. Knowledge graph visualizations further enrich this process by providing a structured and intuitive representation of feature contributions, ensuring alignment with regulatory guidance and public health policies.

The complexity of ensuring adherence to regulatory standards and clinical research is amplified by the vast data sets and diverse frameworks governing compliance. For instance, detecting overpayments in healthcare claims requires navigating extensive data volumes while meeting stringent regulatory and public policy requirements.

Knowledge graphs provide a structured way to map model predictions to domain specific rules, offering a clear understanding of how outcomes correspond to regulatory standards. By visualizing these relationships, stakeholders gain actionable insights into adherence public health guidelines and policy frameworks.

Dual layer explainability delivers transparency at two levels: (i) the feature contribution analysis level, and (ii) the regulatory alignment level. Feature contribution analysis displays how individual claim features influence model predictions, while regulatory alignment demonstrates how predictions satisfy both technical requirements and compliance with clinical research and regulatory policies.

For data integration, embodiments utilize industry standard 837 and 835 file formats transaction formats for claims submission and payment processing. Commonly in the industry, 837 file formats contain bills (i.e., claims) and 835 file formats contain receipts (i.e., payment information associated with the claim). These formats include critical details such as procedure codes, service dates, payment amounts, and adjustments or denials, enabling accurate representation of healthcare services and reimbursements. For data preprocessing compliance, raw data undergoes rigorous cleaning to address missing values, ensuring accuracy and completeness. The structured data set enables the extraction of key features, such as payment adjustments, provider details, and service types, which are crucial for identifying overpayments and adhering to clinical research and regulations.

For feature attribution and mapping, advanced techniques like SHAP or LIME are employed to attribute feature importance. These quantify the impact of individual factors, such as procedure codes, service dates, or payment amounts, on model predictions. Feature attribution and mapping also contextualizes insights within a domain-specific knowledge graph. This step integrates regulatory guidelines (e.g., CMS RAC edits, Health Insurance Portability and Accountability Act (HIPAA) compliance) into the analysis, linking feature contributions to their regulatory implications. This mapping ensures that every model prediction is not only explainable but also demonstrates compliance with healthcare and clinical research standards, fostering trust and accountability.

The knowledge graph 201 is used to create a visual representation that maps the relationships between the model's predictions, individual features, and regulatory rules. This allows users to trace features such as payment amounts, service dates, and procedure codes contribute to a claim's final decision. Embodiments generate graph based explanatory visualizations that provide clarity on how features and regulatory rules contribute to model decisions. These visualizations map individual features, such as procedure codes and payment amounts, to their respective contributions and align them with relevant regulatory guidelines like CMS RAC edits or HIPAA standards. Using a knowledge graph structure, nodes represent features, rules, and decision points, while edges illustrate their relationships, offering an interactive and transparent view of the decision making process. Stakeholders can trace the flow from raw inputs to final predictions, ensuring compliance, building trust, and enabling error analysis. This approach simplifies communication for researchers, administrators, and policy makers while validating adherence to healthcare and clinical research policies.

Module #7 407 utilizes explanatory visualization and generates graph-based representations that show how features and rules contributed to the final decision (prediction).

Module #7 407 also provides interpretability by mapping model predictions to knowledge graph entities. Techniques like SHAP or LIME calculate feature contributions, which are contextualized using the knowledge graph to show how each feature connects to regulatory or domain-specific knowledge.

The explanations resulting from Module #7 407 are logged by Module #8 408 (FIG. 4G). The logging supports and creates a complete audit trail.

Module #7 407 provides to Module #9 409 (FIG. H) user feedback on the explanations. Such provided user feedback serves to inform updates and enhance transparency.

Module #7 407 may implement Algorithm 7 (Generate-Explanations) to provide explanations for predictions and map features to domain knowledge. An input to Algorithm 7 may be "final_risk_scores", "enriched_features", "knowledge_graph", "heuristics_rules", "heuristic_flags", and an output may be "explanations", "visualizations".
Algorithm 7
  Begin
    Step 1: For each claim:
      Compute feature importance using SHAP or LIME
      Query knowledge_graph to map features to domain relationships
    Step 2: Generate textual_explanation:
      Summarize feature importance to the prediction
      If the feature importance is not significant or derivable:
        Use heuristics_rules and heuristic_flags to explain the prediction
    Step 3: Generate Visualization:
      Create graph representation of feature-domain mappings
    Return explanations, visualizations
  End Referring to FIG. 4G, Module #8 408 provides Sequential Layer Impact Analysis and Logging for Audit Readiness. Module #8 408 maintains a sequential audit log. The sequential audit log is a record of each layer's influence on the final prediction.

Module #8 408 tracks and logs each decision stage for auditability, showing layer-by-layer influence on the final prediction. Module #8 408 records outputs from all layers, creating a comprehensive log for compliance checks and transparency.

Module #8 408 logs each layer's output, including heuristic flags, synthetic data generation, supervised model predictions, and metal-model weightings. These logs form a complete, sequential audit trail of decisions, enabling transparent compliance checks and traceability. Each model layers decisions are logged and stored in the knowledge graph, capturing changes and influences sequentially, enabling auditors to trace regulatory compliance directly in the graph.

Module #8 408 outputs to Module #10 410 (FIG. 4I) the comprehensive audit trails and explainability.

Module #8 408 also outputs to Module #9 409 (FIG. 4H) insights from real-world audits and performance evaluations from improvements to earlier (upstream) components Modules.

Module #8 408 may implement Algorithm 8 (LogLayer-Outputs) to log each layer's contributions for audit readiness. An input to Algorithm 8 may be "heuristic flags", "synthetic_claims", "supervised_predictions", "final_risk_scores", and an output may be "audit logs".
Algorithm 8
  Begin
    Step 1: Initialize audit_logs
    Step 2: For each layer within our architecture (Modules #3, #5, #6):
      Record input, output
      Append to audit_logs
    Step 3: Store audit_logs in secure repository
    Return audit_logs
  End Referring to FIG. 4I, Module #10 provides system output in the form of execution and reports.

In Module #10 410, decisioning engines take the upstream Module outputs of recommendations, predicted values, classes identified, and anomalies found, and implement execution.

Module #10 410 feeds to Module #9 409 the predictions, indications of anomalies, and recommendations.

Feedback Loop For Continuous Learning

Figure 4H:
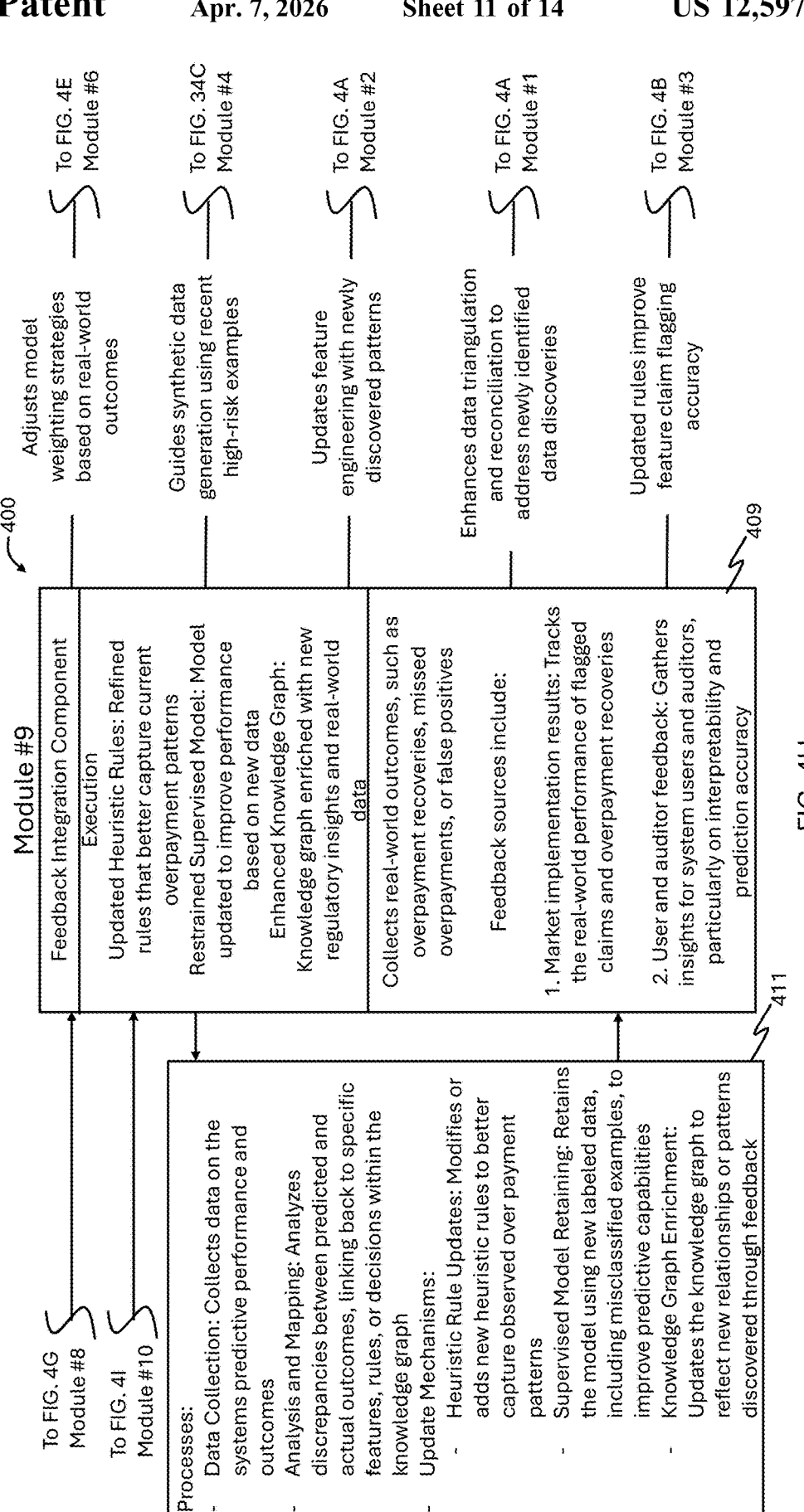
Figure 4I:
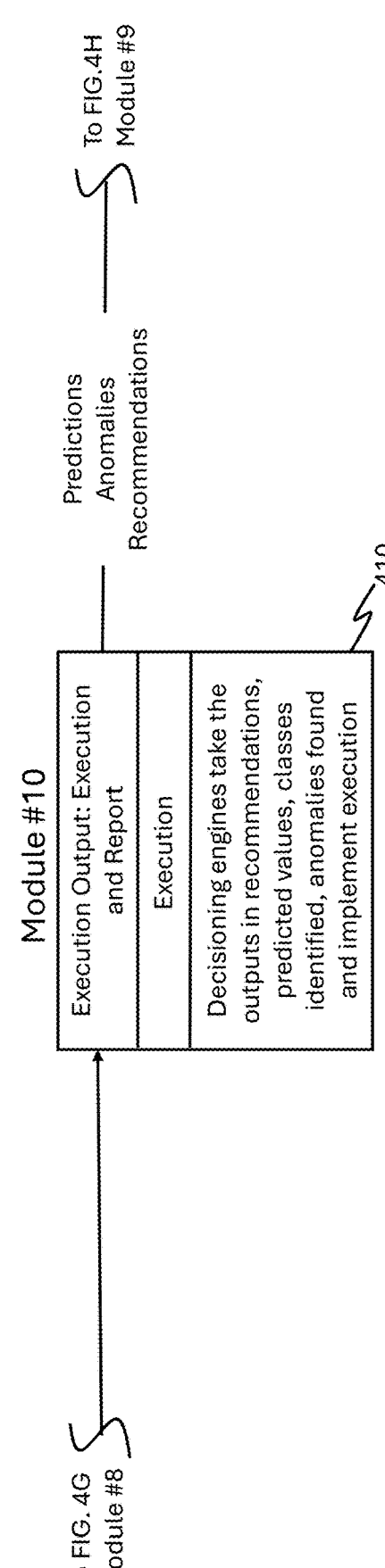

Referring to FIG. 4H, Module #9 409 provides feedback integration to components of the system.

Module #9 409 holds updated heuristic rules. These are refined rules that better capture current overpayment patterns.

Module #9 409 also has a retrained Supervised Model that is a model updated to improve performance based on new data.

Module #9 409 also generates and holds an enhanced knowledge graph. The enhanced knowledge graph is enriched with new regulatory insights and real-world data.

In operation, Module #9 409 collects real-world outcomes, such as overpayments, or false positives. Feedback sources may include: (i) Market Implementation Results that track the real-world performance of flagged claims and overpayment recoveries, and (ii) User and Auditor Feedback that gathers insights from system users and auditors, particularly on interpretability and prediction accuracy.

Module #9 409 executes data collection, analysis and mapping, and updating mechanisms. For data collection, Module #9 409 collects data on the system's predictive performance and outcomes. For analysis and mapping, Module #9 409 analyzes discrepancies between predicted and actual outcomes, linking back to specific features, rules or decisions within the knowledge graph. For updating mechanisms, Module #9 409 (i) updates the heuristic rules by modifying or adding new heuristic rules to better capture observed overpayment patterns, (ii) retains the supervised model using new labeled data, including misclassified examples, to improve predictive capabilities, and (iii) enriches the knowledge graph by updating the knowledge graph to reflect new relationships or patterns discovered through feedback.

Output from Module #9 409 enables Module #6 406 to adjust model weighting strategies based on real-world outcomes.

Output from Module #9 409 also guides synthetic data generation of Module #4 404 using recent high-risk examples.

Output from Module #9 409 enables Module #2 402 to update feature engineering with new discovered patterns.

Output from Module #9 409 further updates heuristic rules of Module #3 403. The updated rules improve future claim flagging accuracy in Module #3 403.

Feedback results of Module #9 409 enhance data triangulation and reconciliation of Module #1 401 and in turn enables Module #1 401 to address newly identified data discrepancies.

Module #9 409 may implement Algorithm 9 (UpdateSystemWithFeedback) to update models, heuristics, and knowledge graph based on real-world feedback. An input to Algorithm 9 may be "real_world_outcomes", "heuristic_rules", "supervised model", "knowledge_graph", and an output may be "updated_system".

Algorithm 9
Begin
  Step 1: Collect feedback predictions on outcomes
  Step 2: Update heuristic_rules in Algorithm 3:
    Identify incorrect flags or missing rules
    Add or adjust rules-based on feedback
  Step 3: Retrain supervised_model Algorithm 5:
    Incorporate new feedback-labeled data
  Step 4: Update knowledge_graph Algorithm 2:
    Add new entities or relationships from feedback
  Return updated_system
End Computer Support FIG. 5 illustrates a computer network or similar digital processing environment in which embodiments of the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 5:
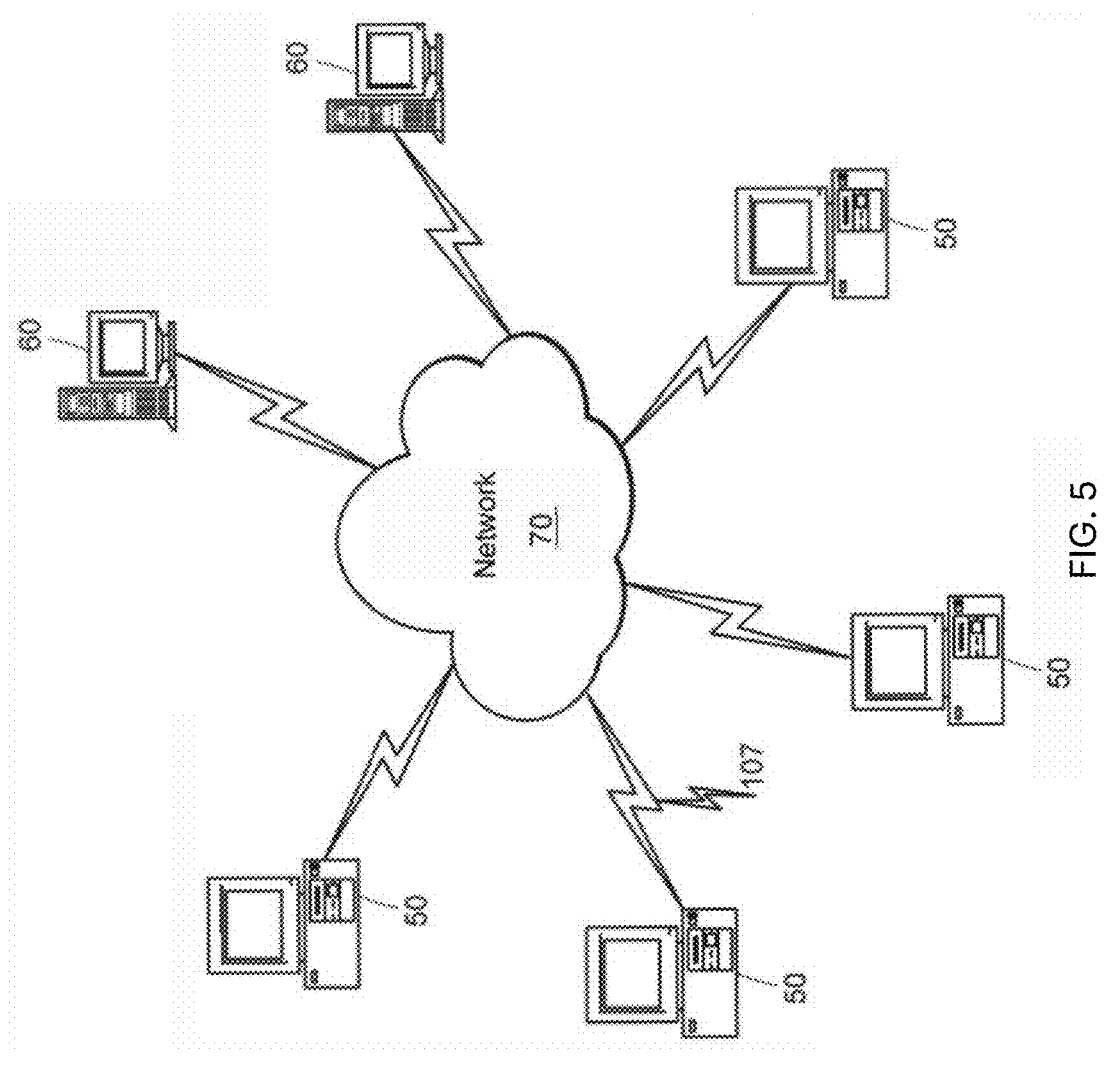
FIG. 5 is a schematic view of a computer network in which embodiments of the present invention are deployed.
Figure 6:
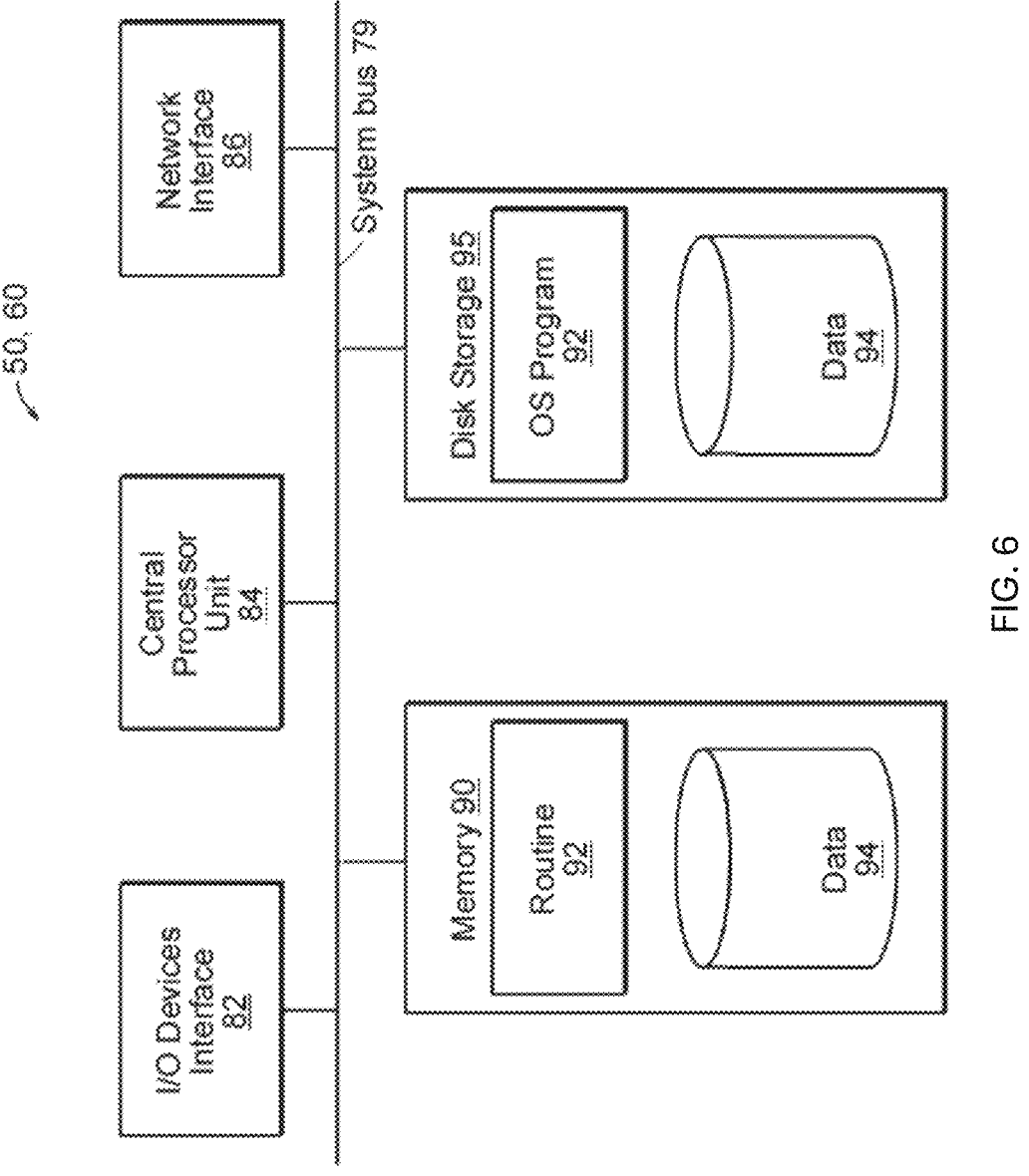
FIG. 6 is a block diagram of a computer node in the network of FIG. 5.

FIG. 6 is a diagram of the internal structure of a computer (e.g., client processor/device 50 or server computers 60) in the computer system of FIG. 5. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 5). Memory 90 provides volatile storage for computer software instructions 92 and data 94 used to implement an embodiment of the present invention (e.g., the component methods, system, techniques, and program code detailed above in FIGS. 1-4I). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium, diskettes, tapes, downloadable files, share files, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so-called Software as a Service (SaaS), or other installation or communication supporting end-users.

Embodiments offer a comprehensive framework designed to ensure compliance with clinical research regulations and healthcare guidelines by integrating claims data, such as procedure codes, service dates, and payment amounts, into a knowledge graph. This approach allows users to trace the rationale behind model predictions while maintaining alignment with essential regulatory standards, including CMS RAC edits, HIPAA compliance, and global health care guidelines. By providing this contextual mapping, embodiments establish a foundation for reliability and precision and regulatory adherence. In addition to regulatory alignment, embodiments enhance interpretability and builds trust among stakeholders by transparently mapping feature contributions to regulatory requirements. This transparency is further reinforced through the inclusion of explanatory visualizations, automated audit trails, and a real-time feedback loop, ensuring continuous improvement and sustained accuracy. These features not only facilitate understanding but also establish confidence in the decision making process across diverse use cases.

By streamlining claims processing, reducing overpayments, and optimizing database management, embodiments deliver operational efficiency while fostering scalability across global markets. Embodiments adaptability to diverse regulatory frameworks makes it an invaluable tool for healthcare providers, payers, and auditors worldwide, driving improved compliance, efficiency, and trust in high stakes environments. This integration of advanced technology with regulatory insight represents a transformative step for healthcare systems.

While example embodiments have been particularly shown and described, it will be understood by those skilled in the art that various changes in form and details may be made therein without departing from the scope of the embodiments encompassed by the appended claims.

For example, the described embodiments are in terms of health insurance but other types of insurance, other insurance claims, and other types of claims may apply. The health insurance description and details are by way of illustration and not limitation of the present invention and Applicant's contribution to the technical arts.

What is claimed is:

1. A computer-implemented method of automatically identifying anomalies in insurance claims, the method comprising, by a processor:

automatically accessing, in memory of the processor, a knowledge graph comprised of (i) a plurality of nodes representing rules and (ii) a plurality of nodes representing relationships;

auditing a given claim for an anomaly, including automatically producing an initial indication of presence or absence of an anomaly in enriched claim data by:

(a) receiving, in the memory of the processor, textual claim data from the given claim;

(b) normalizing, based on the knowledge graph, the received textual claim data to form normalized claim data;

(c) producing a context vector based on the knowledge graph and the normalized claim data, wherein the context vector is specific to the given claim and indicates a relationship between two or more elements of the normalized claim data;

(d) applying the plurality of nodes representing relationships to the normalized claim data to produce enriched claim data; and (e) applying the plurality of nodes representing rules to the enriched claim data and producing an initial indication of presence or absence of an anomaly in the enriched claim data;

generating a risk score representing probability of an anomaly in the enriched claim data by responsively executing a supervised learning model trained on a set of historic claim data indicating presence and absence of anomalies in the historic claim data and-trained on a set of synthetic claim data indicating presence of anomalies in the synthetic claim data, the synthetic claim data being formed from sparse data enhanced in a manner that balances heuristic data and focuses on case data representing relatively high risk of an anomaly;

processing by a meta-model the enriched claim data, the initial indication of presence or absence of an anomaly, and the generated risk score to produce an anomaly score; and generating an outcome of the audit of the given claim by: (i) responsive to the produced anomaly score indicating no anomaly in the given claim, automatically closing the given claim as the outcome of the audit and (ii) responsive to the produced anomaly score indicating presence of an anomaly in the given claim, automatically flagging the given claim as the outcome of the audit.

2. The method of claim 1, further comprising training the supervised learning model, wherein the training comprises, by the processor:

identifying previous claim data comprising an indication of a presence of an anomaly in the previous claim data;

generating a given synthetic claim comprising an indication of a presence of an anomaly; and training the supervised learning model to generate risk scores based on the previous claim data identified and the given synthetic claim generated.

3. The method of claim 2, further comprising updating at least one node of the plurality of nodes representing rules based on the previous claim data identified.

4. The method of claim 1, wherein the processing with the meta model further comprises applying a weight to one or more elements of the enriched claim data based on (i) the indication of presence or absence of an anomaly, (ii) the generated risk score, and (iii) the context vector.

5. The method of claim 1, wherein the received textual claim data comprises at least one of: patient information, provider details, billing codes, and claim amounts.

6. The method of claim 1, wherein the meta-model is further configured to provide information as to which of the enriched claim data, the indication of presence or absence of an anomaly, and the generated risk score contributed to the produced anomaly score.

7. The method of claim 6, wherein the information provided comprises an audit trail comprising a log of at least one of: an output of at least one layer of the knowledge graph, an output of the supervised learning model, the indication of presence or absence of an anomaly in the enriched claim data, a synthetic data set, the generated risk score, the produced anomaly score, a weighting applied to one or more elements of the enriched claim data, a weighting applied to the risk score, and a weighting applied to the context vector.

8. The method of claim 1, further comprising providing feedback on automatically identified anomalies in insurance claims by identifying generated audit outcomes comprising at least one of: an overpayment recovery, an overpayment audit, and a false positive.

9. The method of claim 1, wherein the supervised learning model further comprises a decision engine configured to perform the generating the risk score representing the probability of an anomaly in the enriched claim data.

10. The method of claim 1, further comprising, generating the synthetic claim data by:

at least one autoencoder configured to identify an anomaly in historic claim data based on at least one heuristic flag and at least one knowledge graph relationship; and generating a given synthetic claim comprising an indication of a presence of an anomaly, based on the anomaly in the historic claim data identified.

11. A computer-based system of automatically identifying anomalies in insurance claims, the system comprising:

a processor; and a memory with computer code instructions stored thereon, the processor and the memory, with the computer code instructions, being configured to cause the system to:

automatically access, in the memory, a knowledge graph comprised of (i) a plurality of nodes representing rules and (ii) a plurality of nodes representing relationships;

audit a given claim for an anomaly, including automatically produce an initial indication of presence or absence of an anomaly in enriched claim data by:

(a) receiving, in the memory of the processor, textual claim data from the given claim (b) normalizing, based on the knowledge graph, the received textual claim data to form normalized claim data;

(c) producing a context vector based on the knowledge graph and the normalized claim data, wherein the context vector is specific to the given claim and indicates a relationship between two or more elements of the normalized claim data;

(d) applying the plurality of nodes representing relationships to the normalized claim data to produce enriched claim data; and (e) applying the plurality of nodes representing rules to the enriched claim data and producing an indication of presence or absence of an anomaly in the enriched claim data;

generating a risk score representing probability of an anomaly in the enriched claim data by responsively executing a supervised learning model trained on a set of historic claim data indicating presence and absence of anomalies in the historic claim data and trained on a set of synthetic claim data indicating presence of anomalies in the synthetic claim data, the synthetic claim data being formed from sparse data enhanced in a manner that balances heuristic data and focuses on case data representing relatively high risk of an anomaly;

processing by a meta-model the enriched claim data, the initial indication of presence or absence of an anomaly, and the generated risk score to produce an anomaly score; and generating an outcome of the audit of the given claim by: (i) responsive to the produced anomaly score indicating no anomaly in the given claim, automatically closing the given claim as the outcome of the audit and (ii) responsive to the produced anomaly score indicating presence of an anomaly in the given claim, automatically flagging the given claim as the outcome of the audit.

12. The system of claim 11, wherein, the processor and the memory, with the computer code instructions, are configured to cause the system to train the supervised learning model, where the training comprises:

identifying previous claim data comprising an indication of a presence of an anomaly in the previous claim data;

generating a given synthetic claim comprising an indication of a presence of an anomaly; and training the supervised learning model to generate risk scores based on the previous claim data identified and the given synthetic claim generated.

13. The system of claim 12, wherein, the processor and the memory, with the computer code instructions, are further configured to cause the system to:

update at least one node of the plurality of nodes representing rules based on the previous claim data identified.

14. The system of claim 11 wherein, in the processing with the meta-model, the processor and the memory, with the computer code instructions, are configured to cause the system to:

apply a weight to one or more elements of the enriched claim data based on (i) the indication of presence or absence of an anomaly, (ii) the generated risk score, and (iii) the context vector.

15. The system of claim 11, wherein the received textual claim data comprises at least one of: patient information, provider details, billing codes, and claim amounts.

16. The system of claim 11, wherein the meta-model is further configured to provide information as to which of the enriched claim data, the indication of presence or absence of an anomaly, and the generated risk score contributed to the of the produced anomaly score.

17. The system of claim 16, wherein the information provided comprises an audit trail comprising a log of at least one of: an output of at least one layer of the knowledge graph, an output of the supervised learning model, the indication of presence or absence of an anomaly in the enriched claim data, a synthetic data set, the generated risk score, the produced anomaly score, a weighting applied to one or more elements of the enriched claim data, a weighting applied to the risk score, and a weighting applied to the context vector.

18. The system of claim 11, wherein, the processor and the memory, with the computer code instructions, are further configured to cause the system to:

provide feedback on automatically identified anomalies in insurance claims by identifying generated audit outcomes comprising at least one of: an overpayment recovery, an overpayment audit, and a false positive.

19. The system of claim 11, wherein the supervised learning model further comprises a decision engine, where the decision engine in combination with the processor and the memory with computer code instructions, is further configured to cause the system to perform the generating the risk score representing the probability of an anomaly in the enriched claim data.

20. The system of claim 11, wherein, the processor and the memory, with the computer code instructions, are further configured to cause the system to generate the synthetic claim data by:

at least one autoencoder configured to identify an anomaly in the historic claim data based on at least one heuristic flag and at least one knowledge graph relationship; and generate a given synthetic claim comprising an indication of a presence of an anomaly, based on the anomaly in the historic claim data identified.

* * * * *